United States Patent
Cheah et al.

(10) Patent No.: US 6,788,953 B1
(45) Date of Patent: Sep. 7, 2004

(54) WIRELESS LOCAL LOOP COMMUNICATION SYSTEM USING SLIC MODULE

(75) Inventors: Jonathon Y. C. Cheah, Southlake, TX (US); Zhiping Hu, Bedford, TX (US)

(73) Assignee: Uniden America Corporation, Forth Worth, TX (US)

( * ) Notice: Subject to any disclaimer, the term of this patent is extended or adjusted under 35 U.S.C. 154(b) by 664 days.

(21) Appl. No.: 09/586,911

(22) Filed: Jun. 5, 2000

(51) Int. Cl.[7] ............................................. H04B 1/38
(52) U.S. Cl. ............................. 455/550.1; 455/127.1; 455/552.1; 379/29.04; 379/158
(58) Field of Search ................. 455/550.1, 552.1, 455/553.1, 554.2, 555, 414.1, 13.4, 127.1; 379/26.01, 26.02, 27.01, 29.01, 29.03, 29.04, 32.05, 158, 202.01, 399.01, 412, 422

(56) References Cited

U.S. PATENT DOCUMENTS

| | | | |
|---|---|---|---|
| 4,658,096 A | 4/1987 | West, Jr. ...................... | 379/59 |
| 4,901,307 A | 2/1990 | Gilhousen ..................... | 370/18 |
| 5,103,459 A | 4/1992 | Gilhousen ..................... | 375/1 |
| 5,638,440 A * | 6/1997 | Nix et al. ..................... | 379/412 |
| 5,640,451 A * | 6/1997 | Schopfer ....................... | 379/412 |
| 5,790,631 A | 8/1998 | Minarczik ...................... | 379/2 |
| 5,799,254 A | 8/1998 | Karmi ......................... | 455/528 |
| 5,809,109 A * | 9/1998 | Moyal et al. .................. | 379/22 |
| 5,812,637 A * | 9/1998 | Schornack et al. .............. | 455/426.1 |
| 5,949,148 A * | 9/1999 | Wagner ........................ | 307/10.1 |
| 6,144,722 A * | 11/2000 | Anderson et al. ............... | 379/27.01 |
| 6,169,883 B1 * | 1/2001 | Vimpari et al. ................. | 455/67.11 |
| 6,356,624 B1 * | 3/2002 | Apfel et al. .................. | 379/27.01 |
| 6,615,056 B1 * | 9/2003 | Taylor et al. .................. | 455/74.1 |

OTHER PUBLICATIONS

Data Sheet, Microelectronics Group, Lucent Technologies, L8560 Low–Power SLIC with Ringing, Apr. 2000.
QualComm Wireless Telephones, QCT–1000's DCMA Digital Cellular Fixed Wireless Telephone, Undated, pp. 1–2.

* cited by examiner

Primary Examiner—Tony T. Nguyen
(74) Attorney, Agent, or Firm—Chauza & Handley, LLP; Roger N. Chauza

(57) ABSTRACT

A telephone communication system having a cordless telephone operating in conjunction with a cellular transceiver. A subscriber line interface circuit (SLIC) is controlled by a microprocessor in the cellular transcriber. The SLIC can be controlled to provide standard telephone service to other telephone sets, and includes circuits for testing for foreign voltages on the telephone lines prior to providing SLIC service. Standard RJ-11 jacks are utilized for coupling the telephone sets to the communication system to provide standard telephone service by way of the cellular network.

29 Claims, 15 Drawing Sheets

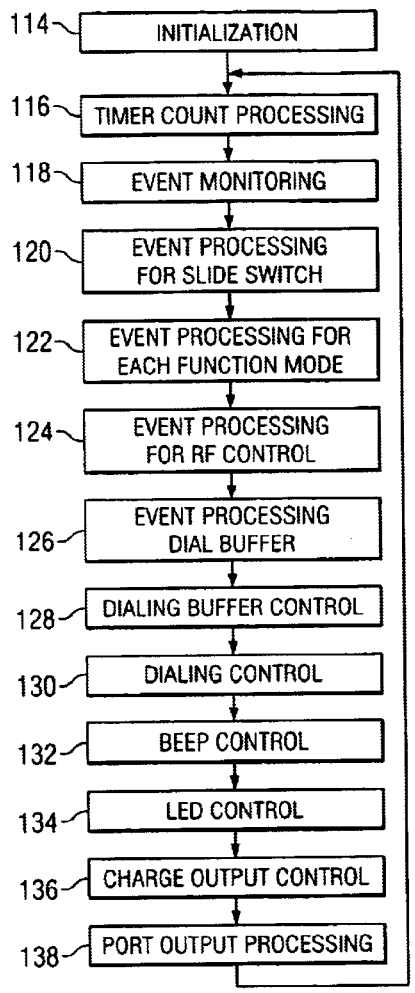
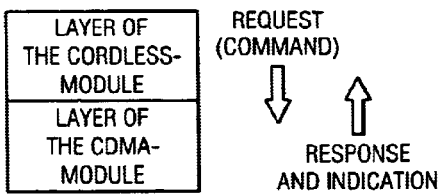
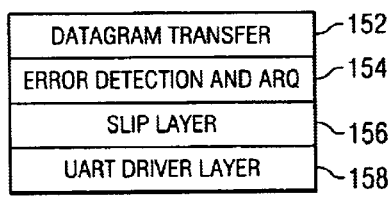
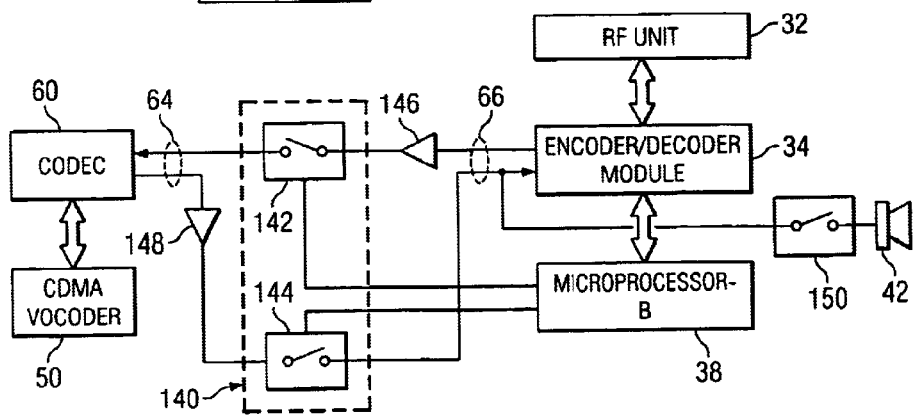

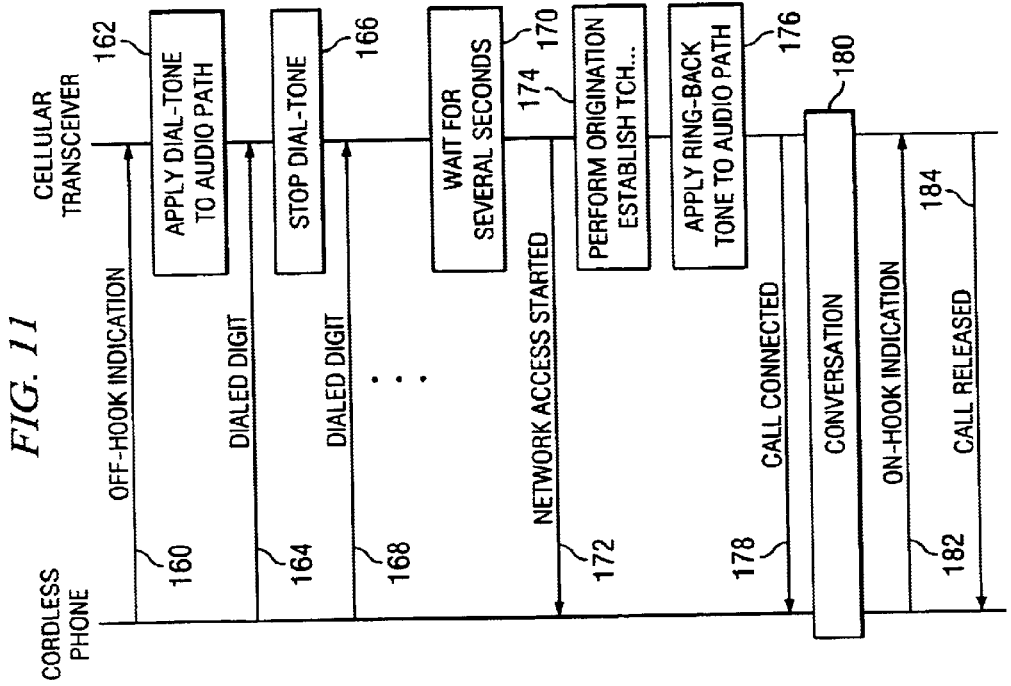

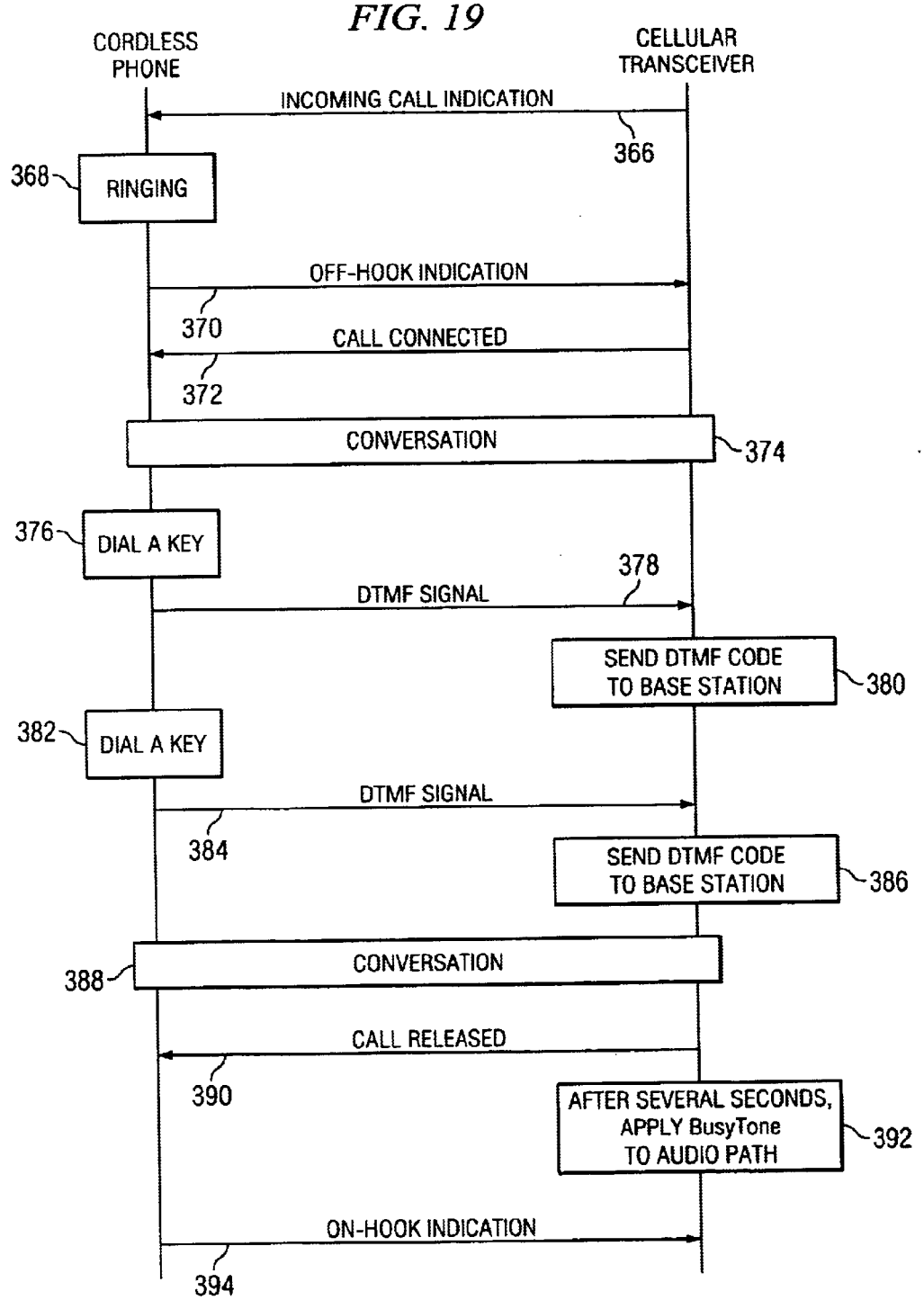

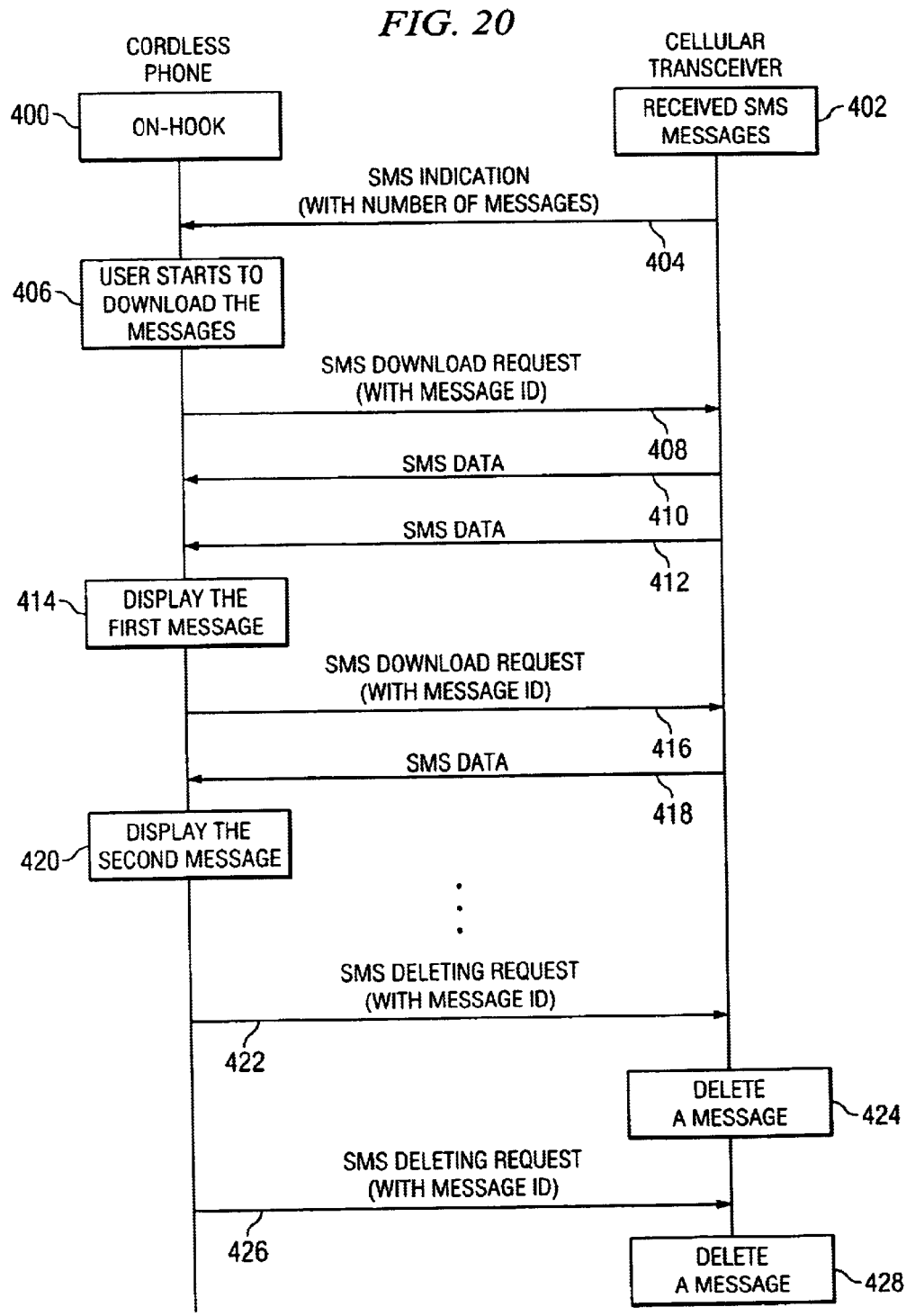

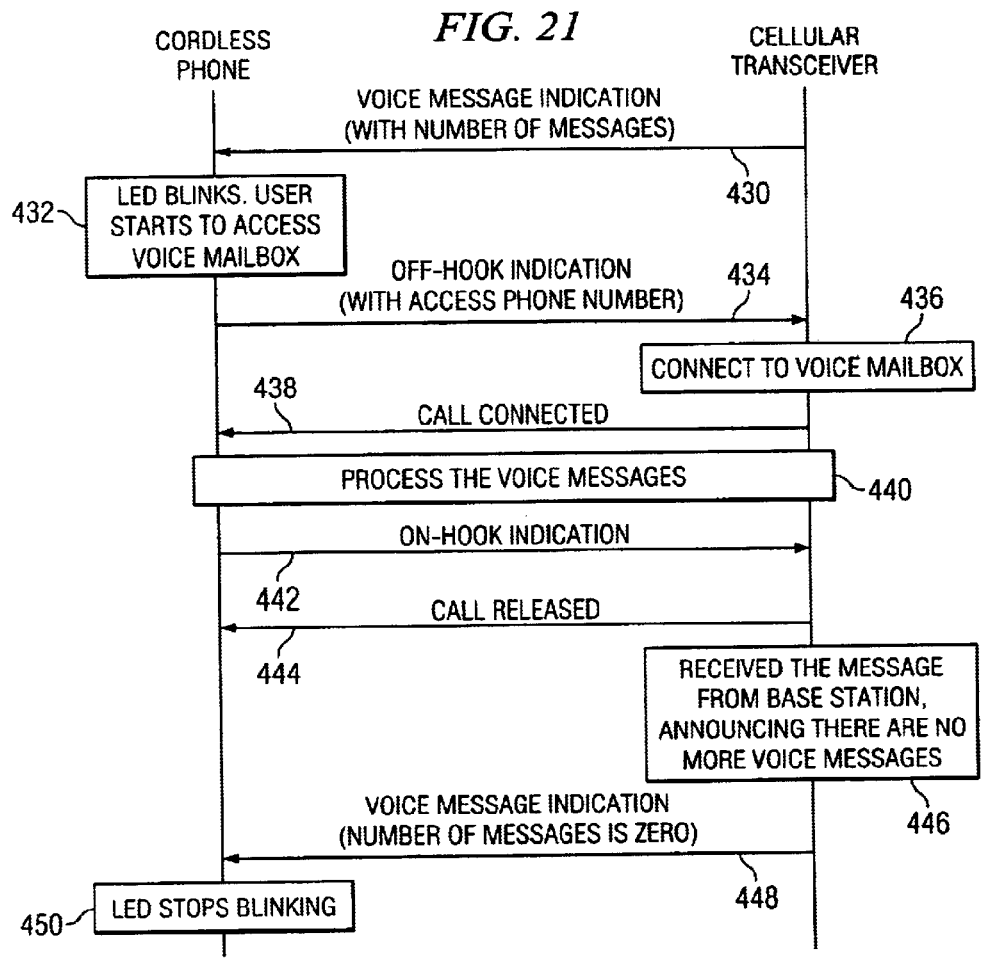
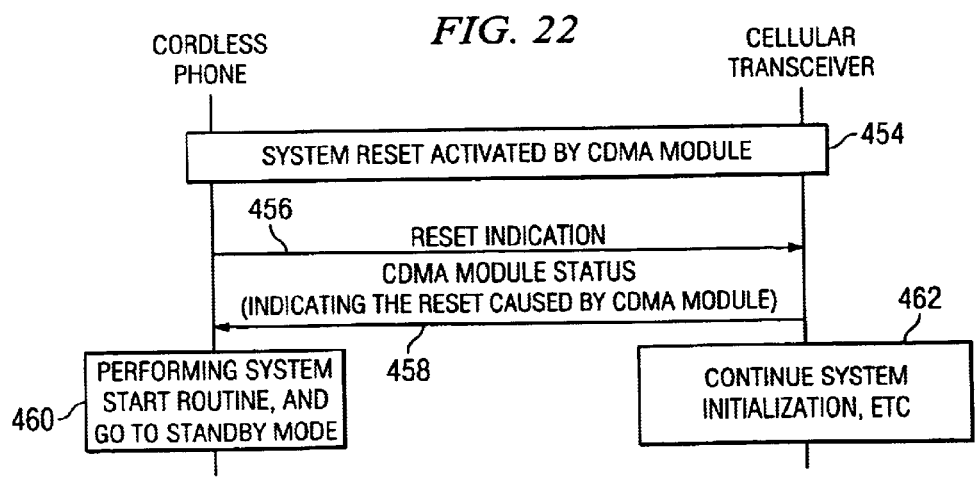

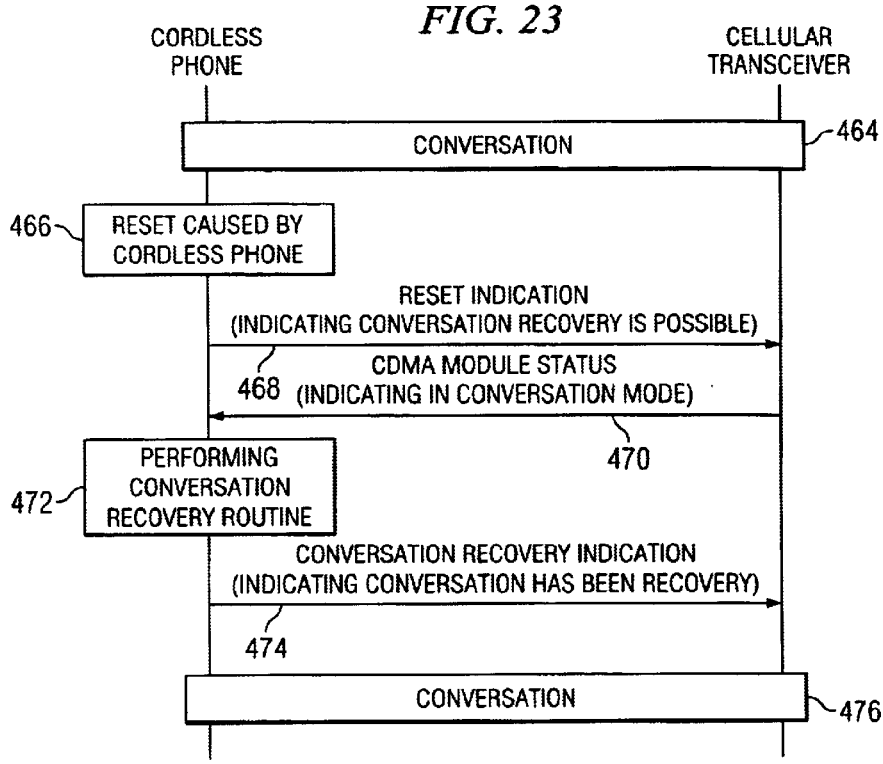
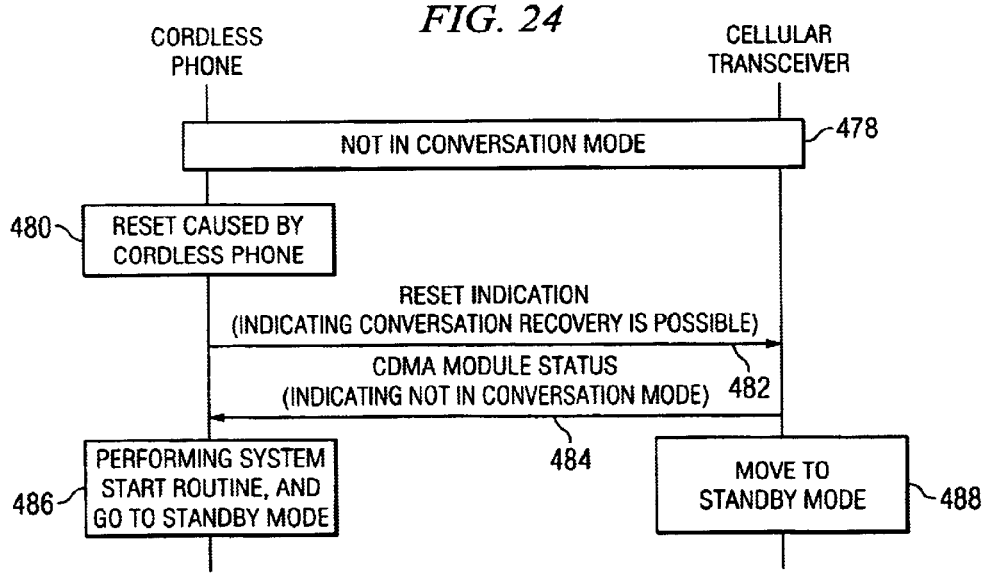

WIRELESS LOCAL LOOP COMMUNICATION SYSTEM USING SLIC MODULE

RELATED APPLICATION

This patent application is related to U.S. application entitled "Wireless Home/Office Telephone System," identified by Ser. No. 09/586,810, filed Jun. 5, 2000.

TECHNICAL FIELD OF THE INVENTION

The present invention relates in general to wireless telecommunications, and more particularly to the utilization of standard home/office telephone sets in conjunction with cellular transmission technology.

BACKGROUND OF THE INVENTION

The vast number of residential telephone sets require the use of a twisted pair metallic telephone line that extends between the telephone set and a remote central office switching system. For convenience and purposes of future expansion, two such pairs of subscriber lines are installed and connected to a subscriber's residence, even if only a single telephone set is employed. While the infrastructure of such type of communication medium is well established, there are numerous shortcomings. For example, the installation of the twisted pair lines is costly, time consuming and susceptible to periodic maintenance. Moreover, the twisted pair lines were designed for voice-grade telecommunications and not for high speed data transmissions. In some instances, the bandwidth of the twisted pair line is limited by filters and other circuits connected to the line at the central office. The standard telecommunication services provided by way of such type of public switched telephone network is commonly known as "plain old telephone service" (POTS). According to the routine POTS service, people have become accustomed to the procedures of making telephone calls using the customary call progress signals which include dial tone before entering digits, busy tone to indicate a busy called party, fast busy for a busy trunk line, etc.

More recently, the wireless telecommunication technology has been implemented to facilitate mobility of the subscribers while utilizing the same and additional telecommunication features. Mobile radios are one example, and the cellular telephone technology is another example of the wireless telecommunication technology. This type of technology does not require the installation of copper wires for carrying voice and data information. However, the wireless telephones themselves are more costly than the standard POTS telephone handsets, even the cordless telephone sets commonly available today. There exists many different types of wireless protocols for transmitting voice and data between the cellular telephones and remote base stations.

One popular wireless protocol is the code division multiple access (CDMA), more specifically described in the specification IS-95, promulgated by the Telecommunication Industry Association. In this type of spread spectrum cellular transmission, there are many frequency channels, and multiple users can simultaneously utilize the same frequency channel. Moreover, each of the multiple users of a particular frequency channel transmits at a different power level. If the proper power transmission levels are maintained, each user allocated to a frequency channel can obtain access to the channel. However, in the event one or more of the cellular transceivers transmits at a power level greater than that initially allocated, other users of the frequency channel are denied use thereof. The capacity of the cellular system is thereby compromised.

Remote cellular base stations defining the various geographical cells monitor signal level transmissions from each cellular transceiver in the operating vicinity, and adjust the power level thereof to achieve a predefined level. The signal levels of the wireless transmissions received by a remote cellular base station can vary due to the user moving closer or further away from the base station, due to obstacles, multi-path reflections of the signal, etc. Because the power adjustments made by the base station on the cellular transceivers power levels are only periodically adjusted, there are times when the transmitted power of a user is in excess of what it should be. For example, if obstacles between the transceiver and the cellular base station cause the signal level of the transmission to be reduced when received by the base station, the base station will transmit coded information to the transceiver of a user to increase its power level. However, if the transceiver thereafter moves so that the obstacle is no longer between the transceiver and the base station, the signal level will be much greater than what it should be. During this time period, one or more other subscribers cannot be assigned to this frequency channel. Cellular system capacity is thus compromised.

Attempts have been made to integrate the cellular technology with home telephone use. This technology is termed "Wireless Local Loop", and is set forth in U.S. Pat. No. 5,799,254 issued to Karmi et al; U.S. Pat. No. 5,790,631 issued to Minarczik et al; U.S. Pat. No. 4,658,096 issued to West, Jr., et al. The temporary installation of a wireless local loop communication system can provide expedited service in disaster areas, or other areas where the POTS system has been damaged. Various features of the wireless local loop system allow the user to utilize standard POTS equipment and techniques without having to learn the more complicated procedures necessary for cellular telephone use.

From the foregoing, it can be seen that a need exists for a method and apparatus for allowing a home or office occupant to be able to utilize a movable or mobile telephone set with the cellular technology, and not adversely affect the user capacity of the wireless cellular system. Another need exists for interfacing standard cordless telephone equipment with cellular transceiver equipment.

SUMMARY OF THE INVENTION

The embodiments of the invention disclosed herein overcome the disadvantages of the corresponding prior art techniques, devices and systems. In one embodiment of the invention, there is disclosed a communication system in which a cellular transceiver is integrated with a cordless telephone. Preferably, the communication system is housed in a single module having a fixed transceiver and cordless telephone antenna. In this arrangement, the transmission power level utilized between the cellular transceiver and a remote cellular base station is maintained at a constant level, irrespective of the movement by the user of the cordless telephone handset.

A subscriber line interface circuit (SLIC) is employed to provide telephone service to other telephone sets connected to the communication system by telephone lines and RJ-11 jacks. The microprocessor in the cellular transceiver controls the SLIC module to provide POTS-type service to the telephone sets. In addition, the microprocessor controls monitor circuits that monitor the telephone line and RJ-11 jack for foreign voltages, and on finding the same, the SLIC module is prevented from providing service to the telephone sets connected thereto.

In accordance with another feature of the invention, the user of the cordless telephone need only communicate utilizing the standard POTS-type of procedures, while yet being allowed the capability of cellular system service. Metallic twisted pair subscriber lines and the corresponding installation and service thereof is not required.

The cellular transceiver is interfaced with the cordless telephone base unit by way of hardware and software interfaces. A processor in the cellular transceiver and a processor in the cordless telephone base unit communicate by way of a bidirectional data bus. A protocol of primitives are passed between the microprocessors to carry out bidirectional communications between the cordless telephone handset and the cellular transceiver. A layered software structure in the microprocessors of the cellular transceiver and the cordless telephone base unit controls the operation of the devices to thereby enable communications and corresponding signals to be passed between the different types of communication equipment.

A subscriber line interface circuit (SLIC) is employed to provide telephone service to other telephones connected to the communication system by telephone lines and RJ-11 jacks. The microprocessor in the cellular transceiver controls the SLIC module to provide POTS-type service to the telephone sets. In addition, the microprocessor controls monitor circuits that monitor the telephone line and RJ-11 jack for foreign voltages, and on finding the same, the SLIC module is prevented from providing service to the telephone sets connected thereto.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, components, elements or functions through the views, and in which:

FIG. 7 is a flow chart of the main processing loop of the cordless telephone base unit;

FIG. 8 is a diagram of the layered software structure of the interface module that resides in the cordless telephone base unit and in the cellular transceiver;

FIG. 9 is a schematic diagram of the analog audio paths between the cordless telephone base unit and the cellular transceiver;

FIG. 10 is a generalized block diagram of the communication software layer of the serial digital interface between the cordless telephone base unit and the cellular transceiver;

FIG. 11 is a flowchart illustrating the call origination sequence between the cordless telephone base unit and the cellular transceiver, when digit dialing occurs after an off-hook condition of the handset;

FIG. 12 illustrates a software diagram of a call origination sequence in which dialing occurs before an off-hook condition of the cordless telephone handset;

FIG. 19 is a software flowchart illustrating a DTMF digit transfer sequence;

FIG. 20 is a software flowchart illustrating a small message service (SMS) transfer sequence;

FIG. 21 is a software flowchart illustrating a voice mail processing sequence;

FIG. 22 is a software flowchart illustrating a reset processing sequence, in which the reset is initiated by the cellular transceiver;

FIG. 23 is a software flowchart illustrating a reset processing sequence, in which the reset is initiated by the cordless telephone base unit;

FIG. 24 is a software flowchart illustrating a reset processing sequence, in which the reset is caused by the cordless telephone base unit;

DETAILED DESCRIPTION OF THE INVENTION

Figure 1:
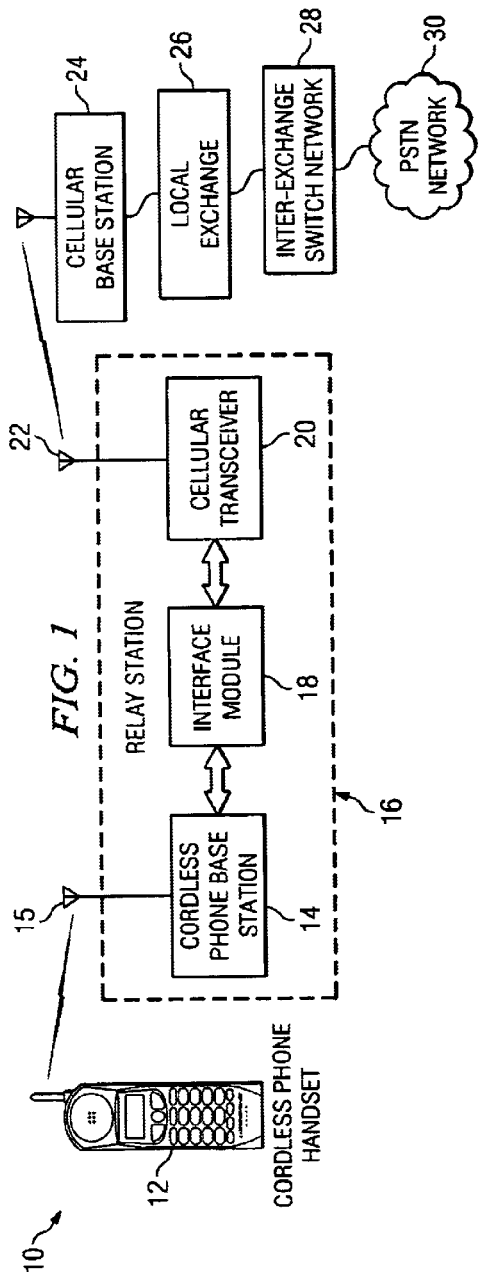
FIG. 1 is a generalized block diagram of the preferred embodiment of the invention, where a cordless telephone is integrated with a cellular transceiver.

In accordance with the principles and concepts of the invention, there is disclosed a telecommunication system utilizing standard corded or cordless telephones in conjunction with wireless cellular technology. Such an arrangement maintains the advantage of wireless cellular technology, but does not require users to become familiar and remember the more complicated procedures of the cellular telephone technology. In other words, telephone subscribers presently familiar with either the standard corded or cordless telephones and the usage thereof can utilize such telephones in the traditional manner, but utilize a fixed cellular transceiver for communicating the voice or data information to a remote cellular base station. In accordance with another feature of the invention, a user can move about his/her premises and use a cordless telephone set coupled to a fixed cellular transceiver, without compromising the user capacity capabilities of the cellular communication system. In the preferred form of the invention shown in FIG. 1, the cordless telephone base unit 14 is coupled to the cellular transceiver 20 by a hardware interface 18 defined by audio and digital lines. A software portion of the interface 18 resides both in the cordless telephone base unit 14 and in the cellular transceiver 20. The components comprising the relay station 16 are preferably integrated into a single modular unit having a cordless telephone antenna and a cellular transceiver antenna FIG. 1 is illustrative of the architecture of the telecommunication system 10 according to a preferred form of the invention. A cordless telephone 12 is illustrated in FIG. 1, as coupled to a cellular transceiver 20 into a single modular unit. In the preferred embodiment, a cordless telephone handset 12 provides wireless voice communications to and from a cordless telephone base unit 14, which comprises part of a relay station 16. Many circuit of the cordless telephone handset 12 and the cordless telephone base unit 14 are of the standard type readily available. The cordless telephone base unit 14 communicates through a hardware and software interface module 18 with the cellular transceiver 20. The cellular transceiver 20 is preferably of the type in which information is transmitted and received by way of the code division multiple access (CDMA) technology. The cellular transceiver 20 is fixed so that its mobility is either substantially or entirely restricted, thereby facilitating the user capacity of the cellular communication system.

The interface module 18 of the relay station 16 receives the standard POTS telephone call progress signals from the cordless base unit 14 and converts the same into other signals utilized by the cellular transceiver 20. Since the cordless telephone base unit 14 is responsive to signals such as dial tone, busy signal, etc., the interface module 18 provides such type of signals to the cordless telephone base unit 14 in response to incoming calls from the cellular communication system. The interface module 18 also collects dialed DTMF digits received from the cordless telephone base unit 14 and combines the same with a "send" signal for transfer to the cellular transceiver 20. The cellular transceiver 20 transmits the signals from a fixed antenna 22 according to the CDMA transmission protocol to a remote cellular base station 24. The cellular base station is of standard design defining a cellular "cell" for receiving local CDMA signals from the numerous cellular transceivers utilized by mobile cellular telephones. The CDMA base station 24 can transfer the received signals to a local exchange 26 through either wireless, satellite or land lines. In the other direction, the local exchange 26 communicates telecommunication information to the CDMA base station 24 for transmission therefrom. In addition, the local exchange 26 is connected to an interexchange switch network 28. The interexchange switch network 28 provides an interface between the cellular technology and the public switched telephone network (PSTN) 30. As noted above, the CDMA base station 24, the local exchange 26, the interexchange switch network 28 and the connections therebetween, as well as to the PSTN 30 are all of conventional design and form a part of the present communication infrastructure.

Figure 2:
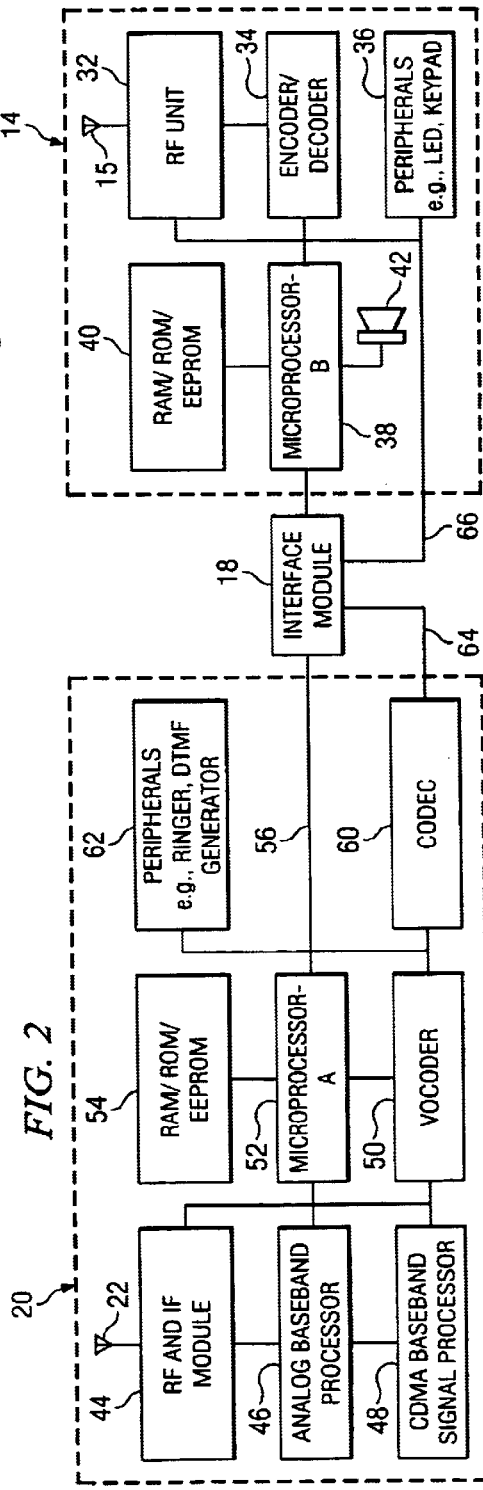
FIG. 2 is a more detailed block diagram of the relay station portion of the cordless-cellular system as situated in an office or home environment.

FIG. 2 is an expanded block diagram of the relay station 16. The cordless telephone base unit 14 includes an RF unit 32 that functions as a transceiver with respect to the fixed cordless telephone antenna 15. The RF unit 32 transmits voice and other signals to the cordless telephone handset 12, as well as receives modulated audio and other signals from the cordless telephone handset 12, via the antenna 15 of the base unit 14. The RF unit 32 is connected to an encoder/decoder 34, as well as to peripheral circuits 36, such as a the visual display, LEDs, keypad, etc. The encoder/decoder 34 is coupled to a programmed microprocessor 38. The microprocessor 38 is supported by various types of memory devices 40, such as random access memory, read only memory and electrically erasable programmable read only memory. The microprocessor 38 also has an output port coupled to a speaker 42. The cordless telephone microprocessor 38 is also programmed with the software that interfaces with audio and digital communications from the cellular transceiver 20.

The digital hardware portion of the interface module 18 is either a serial or parallel communication bus coupled to a UART forming a part of the microprocessor 38 of the cordless telephone base unit 14. In addition, the interface module 18 has bidirectional audio lines 66 coupled to the coder/decoder circuits 34 of the cordless telephone base unit 14.

The cellular transceiver 20 is fixed and is not movable during the use thereof. The cellular transceiver includes an antenna 22 for transmitting and receiving CDMA protocol signals with respect to the cellular CDMA base station 24 (FIG. 1). The antenna 22 of the transceiver 20 is connected to an RF and IF module 44. The RF and IF module 44 is coupled to a CDMA baseband signal processor 48 and to a vocoder 50. An analog baseband processor 46 is coupled to the CDMA baseband signal processor 48. The analog baseband processor 46 as well as the vocoder 50 are connected to a microprocessor 52. The programmed microprocessor 52 is supported by RAM, ROM and EEPROM memory 54. An internal UART of the microprocessor 52 of the cellular transceiver 20 is coupled to the interface module 18 by a digital bus 56. As will be described below, the asynchronous communications is carried out in an RS-232C bus connectorized at each end thereof. The vocoder 50 is coupled by a bus 58 to a codec 60 as well as to peripherals 62, including ringer circuits, DTMF generators, etc. The codec 60 is also coupled to the interface module 18 by a bidirectional analog bus 64.

The transmission of voice and other signals takes place on what is termed a forward channel and a backward or reverse channel of the cellular transceiver 20. The signal processing is carried out in the following generalized manner. The RF module 44 of the cellular transceiver 20 receives the incoming CDMA signals via the antenna 22. The CDMA signals received are those transmitted from the CDMA cellular base station 24 of the cellular communication system. The RF signal is converted to an intermediate frequency in the IF portion of module 44 and down converted to a baseband signal by the analog baseband processor 46. The down-converted signal is transferred to the CDMA baseband signal processor 48 where it is demodulated and decoded. Payload information bits are extracted from the down-converted signal and transferred to the vocoder 50 and therethrough to the codec 60, as well as transferred to the microprocessor 52. The microprocessor 52 transfers digitized voice and other signals to the cordless telephone base unit 16 via the serial digital bus 56. The microprocessor 52 controls the codec for transferring DTMF and other analog information or messages to the interface module 18. Any necessary audio signal that is needed in the cordless base unit 14 in connection with the forward-channel signal processing is either generated by the appropriate generator in the peripheral circuits 62 of the cellular transceiver module 20, or passes through the codec 60 and is converted to analog signals. The analog signals such as ringing signals, dial tone, busy are passed through the interface module 18 on analog audio bus 64. The interface module 18 transfers the digital information and messages to the microprocessor 38 of the cordless telephone base unit 14. The interface module 18 also passes the analog signals on bus 66 to the peripheral circuits 36 of the cordless telephone base unit 14. The encoded digital information and messages are passed by microprocessor 38 to the encoder portion of the circuit 34. The signal is transferred to the cordless telephone handset 12 through use of the RF unit 32, via the antenna 15.

The signal processing transferred on the backward channel of the cellular transceiver 20 is carried out according to the following. When the subscriber using the cordless telephone handset 12 speaks, the information is transferred over the air and received by the antenna 15 of the cordless telephone base unit 14. The RF unit 32 processes the received signal in the standard manner and passes it to the decoder 34. From the decoder 34, control signal bits are transferred to the microprocessor 38, while voice signals proceed via the interface module 18 on analog line 66 to the codec 60 of the cellular transceiver 20. The microprocessor 38 in the cordless telephone base unit 14 also transfers the necessary information bits to the microprocessor 52 of the cellular transceiver 20, via the serial digital bus 56 of the interface module 18. The CDMA baseband signal processor 48 carries out CDMA modulation, encodes the payload information bits therein, and transforms the same into a CDMA baseband signal. The signal is then up converted to an IF/RF signal by the analog baseband processor 46. The signal is then transferred to the RF and IF module 44 by the analog baseband processor 46. The RF portion of the module 44 causes transmission of the CDMA signal to the cellular base station 24, via the fixed cellular transceiver antenna 22.

The transmission and reception of signals by the cordless telephone handset 12 are carried out in the standard manner. In the preferred form of the invention, the cordless telephone handset 12 preferably operates in the 1.9 GHz or 900 mHz band, but any other type of portable POTS-type of telephone handsets can be utilized in conjunction with the invention. Indeed, various features and advantages of the invention can be realized by utilizing a corded telephone set instead of a cordless handset 12.

Figure 3:
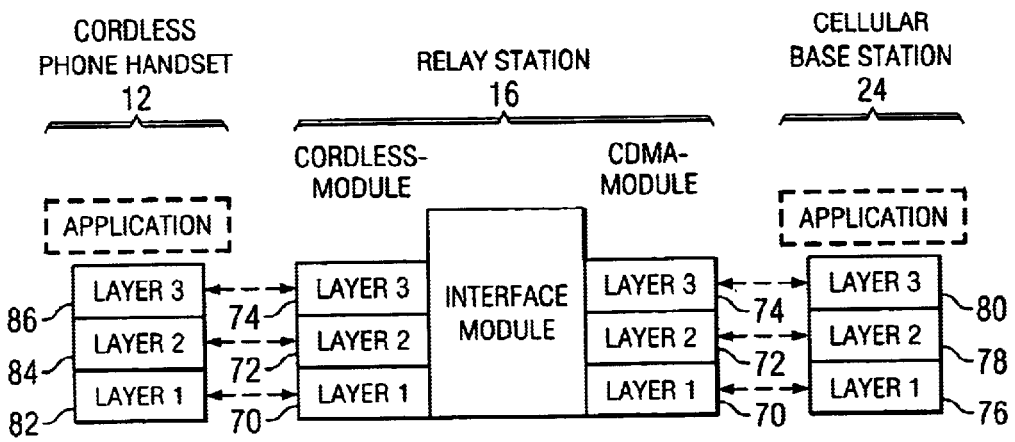
FIG. 3 is a block diagram of the layered software structure of the preferred embodiment of the integrated cordless telephone base unit and the cellular transceiver.

The software layers utilized in conjunction with the preferred form of the invention are similar to these adopted by the International Organization of Standardization (ISO). FIG. 3 illustrates the software structure of the relay station 16 which, for example, includes layered software structures for the cordless base unit 14, the interface module 18 and the cellular transceiver 20. Layer 1 in the ISO communication model constitutes the physical layer, layer 2 constitutes the data link layer and layer 3 constituted the network software layer. In like manner, and with regard to the CDMA remote base station 24, layers 1, 2 and 3 similarly constitute the physical, data link and network layers. The layered software structure with regard to the cordless telephone handset 12 is structured in a similar manner, with the first layer 82 defined as a physical layer, the second layer 84 defined as a data link layer and the third layer 86 defined as the network layer. The free-space transmission protocol occurring between the CDMA cellular base station 24 and the cellular transceiver 20 can be defined by IS-95A and J-STD-008. The free-space transmission protocol between the cordless telephone handset 12 and the cordless base unit 14 is defined by specifications published by Uniden. The interface requirements between the cellular transceiver 20 and the cordless base unit 14 are set forth below.

Figure 4:
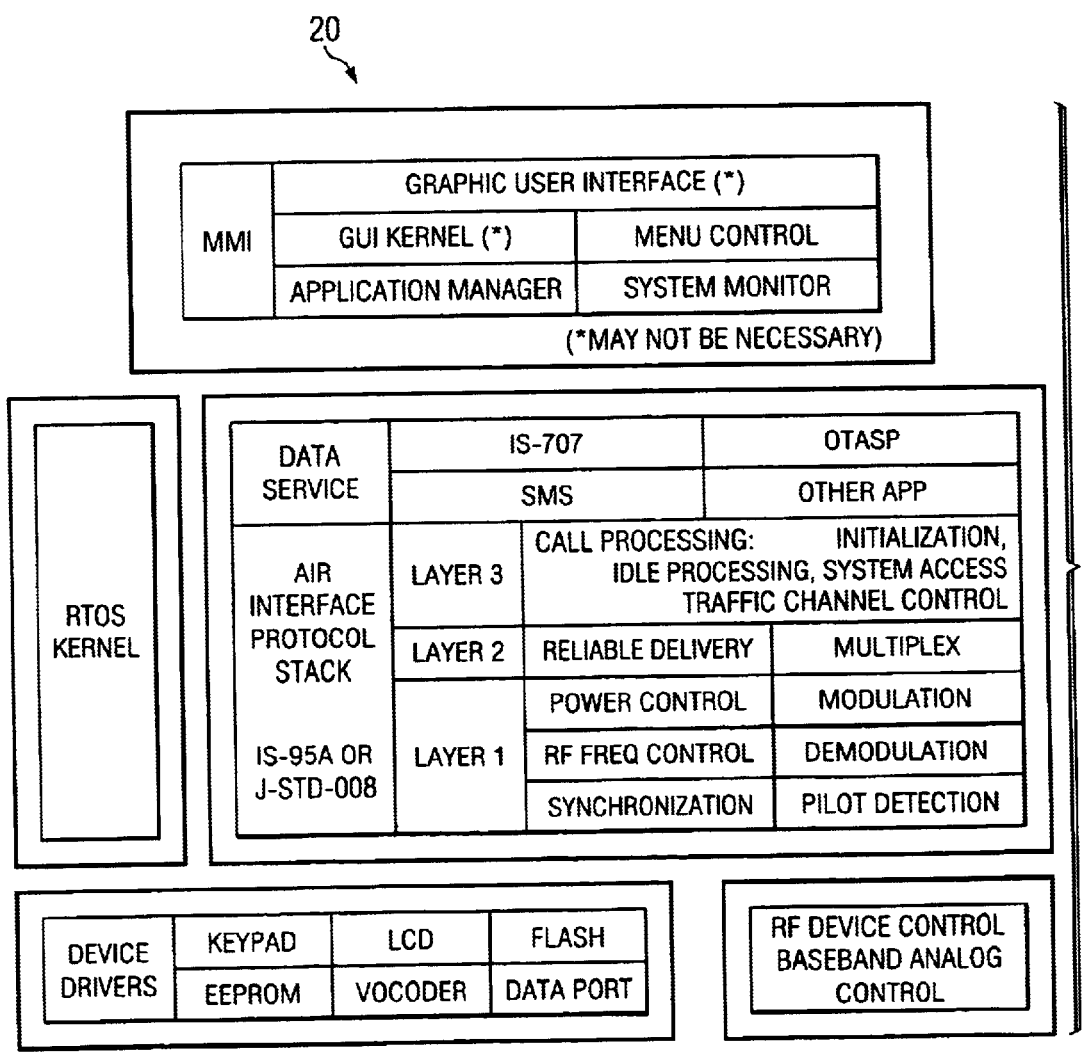
FIG. 4 is a detailed block diagram of the software structure of the cellular CDMA transceiver.

With reference now to FIG. 4, there is shown the software structure of the cellular transceiver 20. Data services in connection with the software structure can be based on IS-707 (packet data service, async and fax services) and IS-637 (short message service), and IS-683 (over-the-air-service provisioning of mobile stations). Based on the labeling of the various functional blocks set forth in FIG. 4, it will be apparent to those skilled in the art the detailed software structure and operation thereof.

Figure 5:
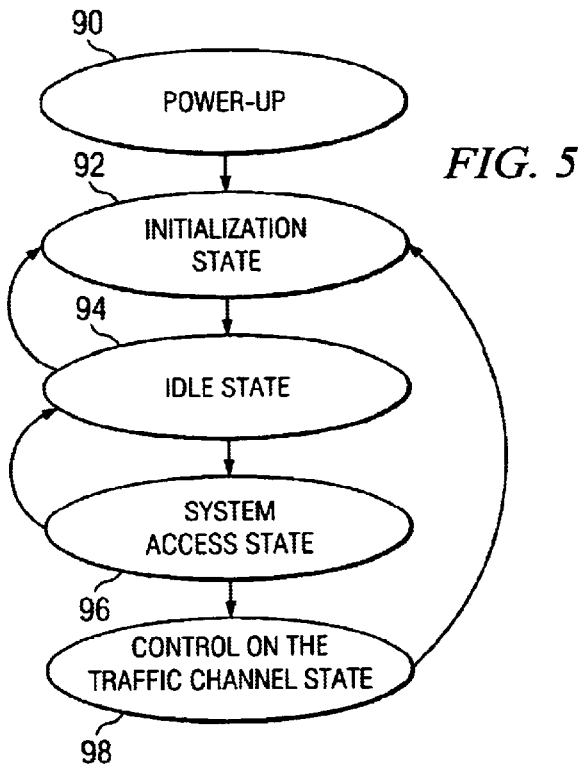
FIG. 5 is a state diagram of the call processing routine of the cellular transceiver.

FIG. 5 illustrates a state diagram defining the call processing flow carried out in the cellular transceiver 20 (FIG. 1). Power is first applied to the various circuits of the cellular transceiver as noted in functional block 90. During the initialization state 92, the cellular transceiver 20 selects and acquires the paging channel of a cellular system operating in its vicinity. From an idle state 94, the transceiver 20 monitors messages on the CDMA paging channel. Paging channels are commonly used to establish communications on other traffic channels between a cellular transceiver 20 and the cellular base station 24. In a system access state 96, the cellular transceiver 20 transmits messages to the cellular base station 24 on a paging channel. From the system access state 96, the transceiver 20 can proceed to a state in which control on an assigned traffic channel 98 is carried out. In this state 98, the transceiver 20 communicates with the cellular base station 24 utilizing the CDMA forward and reverse traffic channels.

Figure 6:
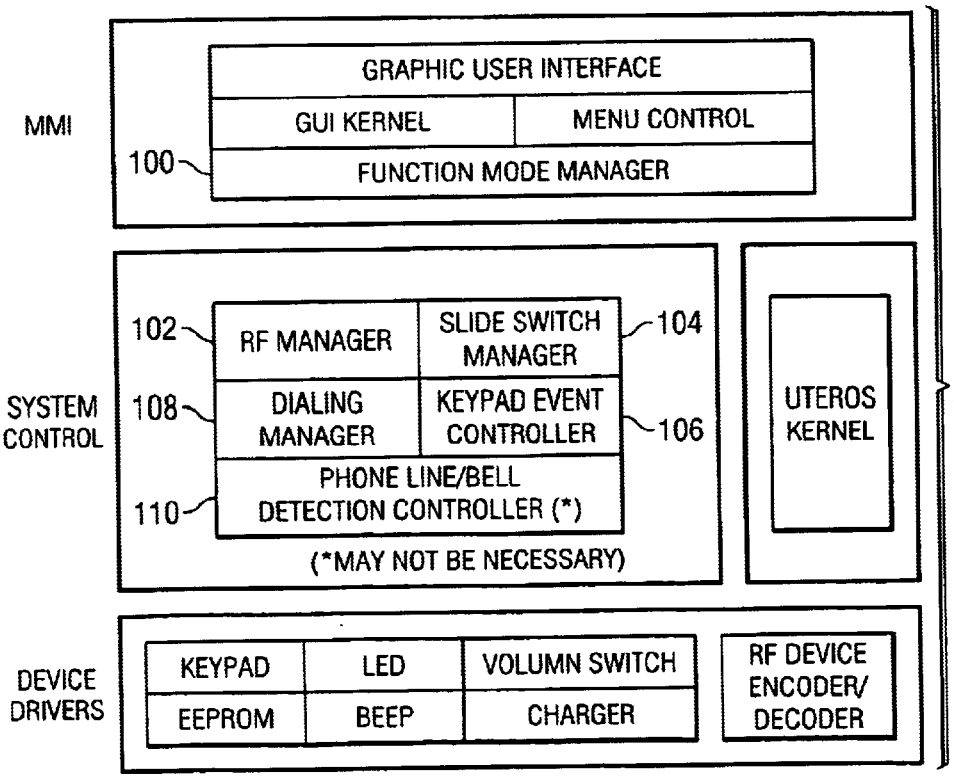
FIG. 6 is a block diagram of the software structure of the cordless telephone base unit.

FIG. 6 depicts the software structure of the cordless telephone base unit 14 (FIG. 1). The software of the cordless telephone base unit 14 is based primarily on a Uniden tiny event driven real-time operating system (UTEROS). This operating system is a real-time system designed for small embedded systems, such as cordless telephones. Other cordless telephone operating systems can be utilized with equal effectiveness in the invention.

The software structure of the cordless telephone base unit 14 includes various managers. The function mode manager 100 monitors events from each system control module, such as the manager/controller, and makes basic mode transitions, controls dialing, etc. An RF manager 102 receives events from the cordless telephone handset 12, dispatches transmission commands to the handset 12, manages the RF channel information and controls the RF phase locked loop. A charge detection and control software routine (not shown) detects DC charger ON/OFF states, and the transmission data channel. A slide switch manager 104 monitors and controls the state of the various slides switches. A keypad event controller 106 generates corresponding events for each depression of a key. A dialing manager 108 manages a buffer for dialed telephone numbers, and outputs the telephone numbers from the buffer storage. Lastly, a phone line/bell detection controller 110 detects the events from the telephone line and detects bell events. The functions of the other software routines and modules shown in FIG. 6 are apparent to those skilled in the art from the labeling thereof.

The flowchart of FIG. 7 illustrates the main processing loop of the cordless telephone base unit 14. As noted above, while the UTEROS operating system is utilized, other operating systems typically employed in cordless telephones can be used with equal advantage. The primary software functions of the cordless telephone base unit 14 are the initialization of the UTEROS system, registering of all tasks, the initialization of all variables utilized by the tasks, and execution of a closed loop which includes the event manager and task scheduler for the operation of the UTEROS software system. The task scheduler dispatches predefined registered tasks from event-driven schemes with a prioritized event activation table. Each task is executed upon the detection of an event, and is interrupt enabled by an IRQ signal. In the main processing loop, initialization of the system is shown as reference numeral 114. Processing then proceeds to a timer count processing function, as shown by functional block 116. Event monitoring occurs in software instructions corresponding to program flow block 118. Event processing for the slide switches takes place in accordance with the instructions depicted by program flow block 120. Event processing for each of the functional modes is carried out by the cordless telephone base unit 14 in accordance with program flow block 122. Event processing for RF control and the dial buffer is carried out in respective blocks 124 and 126. Control of the dialing buffer is carried out as shown by program flow block 128. Dialing control, beep control and LED control are carried out by respective blocks 130, 132 and 134. Charge output control with regard to the DC charging of the base unit battery is carried out as shown in program flow block 136. Lastly, port output processing is carried out in the main processing loop as shown by functional block 138. As noted above, the software interface 18 (FIG. 1) provides the interface functions between the cellular transceiver 20 and the cordless telephone base unit 14.

In simplified form, FIG. 8 illustrates the layered software structure for the interface module 18. As noted above, the interface software resides in the microprocessor 38 of the cordless telephone base unit 14, and in the microprocessor 52 of the cellular transceiver 20. The interface software functions as a master-slave structure. In other words, the cordless telephone base unit 14 is caused to function as a master which sends request primitives (or commands) to the cellular transceiver 20. In response, the cellular transceiver 20 functions as a slave, and transmits response and indication primitives to the upper layer of the cordless telephone base unit 14. The request primitives are those commands generated by the cordless telephone base unit 14 and directed, via the software and hardware of the interface module 18 to the cellular transceiver 20. In contrast with a regular telephone set which communicates via the telephone line of the PSTN, the cordless telephone base unit 14 communicates with the lower software layer of the cellular transceiver 20. The request primitives are designed to function in a manner similar to the signals transmitted on the telephone line of the PSTN. To that end, software changes needed to retrofit cordless telephones to function in accordance with the invention will be minimum.

The REQUEST primitives initiated by the cordless telephone base unit 14 for dialing digits are set forth below. When a user initiates an outgoing call and begins dialing digits, a conventional POTS phone will send dialed signals (DTMP or PULSE signal) over the twisted pair telephone lines. In accordance with the present invention, the cordless telephone base unit 14 sends similar REQUEST primitives to the cellular module transceiver 20.

(1) REQUEST primitive of DIAL__1:
When a user dials the digit "1", this primitive is transmitted to the cellular transceiver 20, to request the collection of the dialed digits, to buffer the received digits and transmit the digits for starting an outgoing call if a completed telephone number has been dialed. The cellular transceiver 20 carries out a routine to determine whether or not a completed telephone number has been dialed.

(2) REQUEST primitive of DIAL__2:
similar to the primitive of DIAL__1.
(3) REQUEST primitive of DIAL__3:
similar to the primitive of DIAL__1.
(4) REQUEST primitive of DIAL__4:
similar to the primitive of DIAL__1.
(5) REQUEST primitive of DIAL__5:
similar to the primitive of DIAL__1.
(6) REQUEST primitive of DIAL__6:
similar to the primitive of DIAL__1.
(7) REQUEST primitive of DIAL__7:
similar to the primitive of DIAL__1.
(8) REQUEST primitive of DIAL__8:
similar to the primitive of DIAL__1.
(9) REQUEST primitive of DIAL__9:
similar to the primitive of DIAL__1.
(10) REQUEST primitive of DIAL__0:
similar to the primitive of DIAL__1.

The following REQUEST primitives are transmitted to the cellular transceiver 20 by the cordless telephone base unit 14 for dialing symbols.

(1) REQUEST primitive of DIAL__AST:
When a user dials the asterisk symbol "*", this primitive is transmitted to the cellular transceiver 20 to request the sending of the corresponding symbol "*" to cellular base station 24.
(2) REQUEST primitive of DIAL__SRP
When the user dials the pound symbol "#", this primitive is transmitted to the cellular transceiver 20 to request the sending of the same symbol to the cellular base station 24.

Other REQUEST primitives include the conventional cordless telephone function keys such as "TALK", "FLASH", "PAUSE", "REDIAL" etc. When these keys are depressed, corresponding REQUEST primitives are sent to the cellular transceiver 20.

The RESPONSE and INDICATION primitives of the preferred embodiment are described below. The RESPONSE and INDICATION primitives are messages from the cellular transceiver 20, to the upper layer of the cordless telephone base unit 14. RESPONSE primitives by the cellular transceiver 20 are preferably paired with the REQUEST primitives of the cordless base unit 14. In some cases, one kind of RESPONSE primitive may be utilized for responding to several types of REQUEST primitives. INDICATION primitives function to carry the basic information and events from the cellular transceiver 20 to the cordless telephone base unit 14. It is noted that all the primitives are communicated between the two microprocessors 38 and 52 on the serial data bus 56.

The basic call setup primitives are identified and described below.

(1) Primitive: INCOMING__CALL
This primitive provides to the cordless telephone base unit 14 an indication that there is a CDMA incoming call.
(2) Primitive: CALL__CONNECTED
This primitive indicates that the incoming call has been established.

(3) Primitive: CALL_RELEASE

This primitive indicates that the call has been released by cellular base station 24 by the other party.

(4) Primitive: CALL_FADE

This primitive indicates that the call has ended abnormally.

Information display primitives are utilized in the interface module 18 according to the following.

(1) Primitive: INFO_DISPLAY

This primitive transports visual display information in an information record.

(2) Primitive: CALLED_PARTY

This primitive transports the display information of the called party.

(3) Primitive: CALLING_PARTY

This primitive transports the display information of the calling party.

(4) Primitive: CONNECTED_NUM

This primitive transports the display information of responding party in the information record.

The alert and tone primitives utilized in the interface module 18 are set forth below.

(1) Primitive: ABRV_ALERT

This primitive is an indication for generating a CDMA abbreviated alert.

(2) Primitive: STOP_ALERT

This is an indication for halting either an incoming alert or a pending alert.

(3) Primitive: REORDER

This is an indication for generating a reorder tone.

(4) Primitive: INTERCEPT

This is an indication for generating an intercept tone.

(5) Primitive: DTMF_BURST

This is an indication for generating a series of DTMF tones.

(6) Primitive: SIGNAL

This is an indication for generating a tone signal defined in the SIGNAL field of the information record.

The data service primitives utilized in the preferred form of the invention are described below.

(1) Primitive: DATACALL

This is an indication for initiating a data call.

(2) Primitive: SMS

This is an indication for displaying and processing an incoming SMS message.

(3) Primitive: MSG_WAITING

This is an indication for displaying the number of messages waiting to be retrieved by the user.

The system related primitives are described below.

(1) Primitive: LOCK

This is a CMA lock order command.

(2) Primitive: UNLOCK

This is a CDMA unlock command.

(3) Primitive: MAINTREQ

This is a CDMA maintenance required command.

(4) Primitive: NAM_CHANGED

This is a NAM changed via Auto NAM command.

(5) Primitive: STANDBY_SLEEP

This is an indication for entering a power-down sleep mode of the interface.

(6) Primitive: STANDBY_WAKE

This is an indication for exiting the power-down sleep mode.

The following illustrate some of the major LCD messages for display with the cellular transceiver 20. Various of these messages are useful for the display of messages, and some are helpful in the cellular transceiver 20 for system testing.

(1) BANNER, personal banner
(2) NAM, display current NAM name
(3) NAM_INFO, display current NAM name
(4) NUMBER, display own phone number
(5) LOCKCODE,
(6) BADCODE,
(7) LOCK_WARN,
(8) RESTRICTED,
(9) NO_ONETOUCH,
(10) MISSED_CALL,
(11) HELP, soft key labels using custom soft key
(12) SOFTKEYS, fonts in upper CG ROM
(13) DIAL_ALPHA, dialing phone number display
(14) SEND_PIN, dialing phone name display
(15) AKEY, send pin? [YES][NO] prompt
(16) SRCH_AEDIT, AKEY entry
(17) ASRCH_TITLE,
(18) SECRET, secret number
(19) VERIFY, verify memory stored
(20) STATUS, verify memory stored
(21) DECADE_NONE, recall empty decade error
(22) AMATCH_NONE, no memory name matches
(23) SERVICE, service required
(24) MAINT_REQ, maintenance required
(25) LOWPOWER, low power deep sleep
(26) BADNAM, NAM is erroneous version of service req.
(27) CALL, system in a call display
(28) NOSVC, no service error
(29) LOOP1, loopback display
(30) NUM, phone numbers display
(31) AEDIT, alpha editor
(32) TIME, call timer
(33) MUTE, MUTE display
(34) PAD,
(35) NUMEDIT,
(36) SECTIME, display time down to seconds
(37) CALLTIME, total calls display, reset
(38) ALLCALLS, total calls display, no reset
(39) BANNERSHOW,
(40) SETLBL,
(41) SETVAL,
(42) SERV1,
(43) SERV2,
(44) LSTLBL,
(45) LSTVAL,
(46) LSTVAL2,
(47) HOMESYS, used to choose from list
(48) ERRNAME,
(49) ERRNUM,
(50) ERRFATAL,
(51) ERRLINE,
(52) ERRCNT, display errors from NV
(53) CURSOR, cursor
(54) RCL,

(55) STO, RCL and STO prompts
(56) ADDR,
(57) OVER, verify memory replacement
(58) MIN1,
(59) MIN2, show MIN1 and MIN2
(60) BADNAM2,
(61) MSG_EMPTY, empty location for MSG_EMPTY
(62) MSG_INVALID_ADDR,
(63) MSG_NONE, no memory saved to scroll
(64) MSG_NOST, no numbers stored on last call stack
(65) MATCH_LOOK,
(66) MATCH_NONE, no memory matches
(67) MSG_NFREE, STO STO ran out of memory locations
(68) MSG_ERRSVC, need phone number for this operation
(69) MSG_RSTRCT, the phone is restricted
(70) CALLFAIL, call failed message
(71) RETRY, call retry display
(72) MENU, menu selection field
(73) MENUB, blinking character in upper right
(74) FEATURE_UNAVAIL,
(75) INVALID_MODE_SEL,
(76) CODES_NOT_MATCH, used when entering new sec. code
(77) CODE_CHANNGED, used to display new security code
(78) PREPENDT, prepend title
(79) 13K, 13K selection confirmation
(80) INFO_MSG, show remainder of phone #
(81) VIEW,
(82) SLEAVE,
(83) SENTER,
(84) SCHANGE, service change alert
(85) MSG_ALERT, incoming call CLI
(86) CLI_ALERT, incoming call CLI
(87) LOWBATT, low battery display
(88) BADBATT, The interface bus connections shown in FIG. 1 between the interface module 18 and both the cellular transceiver 20 and the cordless telephone base unit 14, include asynchronous bidirectional buses, shown by the pair of double-headed arrows. In particular, the bus between the cellular transceiver 20 and the cordless telephone base unit 14 is based on an RS-232C asynchronous serial interface which supports full duplex asynchronous communications. The data frame comprises seven or eight data bits, one parity bit and one or two stop bits. The interface module 18 has three signal lines, including a receive (REC), a transmit (TX) and a ground (GND) serial bus. Various data transmission rates are selectable. As noted above in connection with FIG. 2, the microprocessor 38 in the cordless telephone base unit 14, as well as the microprocessor 58 in the cellular transceiver 20 both include a UART that allows asynchronous transmission of signals therebetween on the transmit and receive signal lines identified above. Although full duplex asynchronous communications is utilized in the preferred embodiment, those skilled in the art may utilize a synchronous serial interfaced between the two processors with equal effectiveness. As yet another alternative, a dual port buffer memory can be utilized between the microprocessors 38 and 52 to facilitate transfer of information between the processors.

With regard to FIG. 9 there are illustrated the analog bidirectional signal paths between the cordless telephone base unit 14 and the cellular transceiver 20. The functional blocks shown in FIG. 9 are identified with the same reference numerals as those noted above in connection with FIG. 2. In addition, a switch mechanism 140 is operative to control the direction of analog signals between such equipment. The microprocessor 38 of the cordless telephone base unit 14 controls operation of a first switch 142 and a second switch 144. A driver 146 is coupled between the encoder/decoder module 34 of the cordless telephone base unit 14 and the first switch 142. The output of the switch 142 is coupled to an input of the codec 60 of the cellular transceiver 20. With this arrangement, a switched connection is provided for transferring analog audio signals from the encoder/decoder module 34 to the codec 60. Analog audio signals are transferred in the other direction between the codec 60, and a buffer driver 148, the output of which is switched by the second switch 144 to an input of the encoder/decoder module 34. In addition, the third switch 150 is operative to switch the audio signals received by the cordless telephone base unit 14 to the speaker 42 of the cordless telephone. It should be noted that basic call progress tones, such as DTMF tones, busy tones, bell signals, ring back signals, and the like are generated in the codec 60 of the cellular transceiver 20 and transmitted to the cordless telephone base unit 142 via the second switch 144.

The layered software structure between the cellular transceiver 20 and the cordless telephone base unit 14 is set forth in FIG. 10. The layered communication software includes a datagram transfer software module 152, an error detection and ARQ module 154, a slip layer 156 and a UART driver software layer 158.

Data packets are communicated between the cordless telephone base unit 14 and the cellular transceiver 20 via the serial asynchronous duplex bus. There are six fields in a data packet, shown in the following Table I, and described below.

TABLE 1

| END | PKT NUMBER | PRIMITIVE TYPE | DATA | CRC | END |
|---|---|---|---|---|---|
| 1 byte | 1 byte | 1 byte | Variable | 1 byte | 1 byte |

(1) The one-byte END field is defined in the SLIP protocol (RFC1055), which is incorporated herein by reference.
(2) The one-byte PKT NUMBER field is the packet number assigned to the packet, which is used for duplication checking. Packet numbering starts at 0 and proceeds to 255, then, returns back to 0.
(3) The one-byte PRIMITIVE TYPE field defines the type of primitive utilized.
(4) The variable length DATA field is the data section of the primitive.
(5) The one-byte CRC error checking field is performed across PRIMITIVE TYPE and DATA fields. The generator polynomial for the CRC routine is:

$$g(x)=x^8+x^5+x^4+1$$

Data packet transmitting is carried out in the following manner.

(1) A data packet is composed adding PKT NUMBER and CRC fields to the data packet.
(2) The packet is transmitted through the SLIP software layer and the UART driver layer of the software when the interface is ready.
(3) New data packet transmission is delayed until receiving an ACK packet in response to the current transmitted data packet, until a control timer (500 ms) has timed-out.
(4) If there is a new data packet received during the waiting time for an ACK packet to the transmitted data packet, an ACK packet for the received data packet is transmitted.

(5) After receiving the ACK packet, the following is carried out:
  Case A: If the received ACK packet is the ACK-NG primitive, re-transmit the current data packet.
  Case B: If the received ACK packet is the ACK_OK primitive, proceed with processing of the next data packet.
(6) If no ACK packet has been received and the control timer has timed-out, re-transmit the current data packet. If there is no ACK packet received thirty seconds after re-transmission, reset the system with the watchdog timer.
(7) No ACK packet should be transmitted for receiving an ACK packet, even if there are errors in the CRC checking.

Data packet receiving is carried out as follows.

(1) Retrieve the received data from the UART driver layer, and separate the data into data packets at the SLIP software layer.
(2) Perform CRC checking across the PRIMITIVE and DATA fields,
  Case A: If there are no errors in the CRC checking, transmit an ACK-OK primitive.
  Case B: If there are errors in the CRC checking, transmit an ACK-NG primitive.
(3) Check to determine whether the PKT NUMBER is the same as the one in the previous data packet.
  Case A: If the packet numbers are the same, discard the current data packet.
  Case B: If the packet numbers are different, transfer the data to the upper layer.

The following are the definitions of the primitives from the cordless telephone base unit 14.

(1) Primitive Name: Off-Hook Indication
  This primitive indicates that the cordless telephone has gone to an off-hook condition. The primitive may carry a complete telephone number if the user dialed the number before pressing the TALK key. A complete dialed telephone number is represented by 8 bits per digit, with a maximum of 32 bits, provided the user dialed the number before pressing the TALK key. Otherwise, the length is zero.

TABLE 2

Representation of DTMF Digits

| Digit | Code (8 bits) | Digit | Code (8 bits) |
|---|---|---|---|
| 1 | 0x01 | 7 | 0x07 |
| 2 | 0x02 | 8 | 0x08 |
| 3 | 0x03 | 9 | 0x09 |
| 4 | 0x04 | 0 | 0x0a |
| 5 | 0x05 | 0 | 0x0b |
| 6 | 0x06 | # | 0x0c |

(2) Primitive Name: Dialed Digit
  This primitive carries in a field thereof one dialed digit, which is eight bits as set forth, in Table 2.
(3) Primitive Name: FLASH Indication
  This primitive indicates that the user has pressed the FLASH key, which is normally used for Call-Waiting/Three-way Conversation. The data length for this primitive is zero.
(4) Primitive Name: CONF Indication
  This primitive indicates that the user has pressed the CONF key to initiate a three-way conversation. Again, the data length is zero.
(5) Primitive Name: DTMF Signal
  This primitive indicates that the user has either pressed or released one of the following keys "0"–"9", "#" or "*". This primitive is normally used for sending DTMF signals to the other party.
  Data Section:
    BYTE1 (8 bits): DTMF code, see Table 2
    BYTE2 (8 bit): key status,
      1: key pressed.
      0: key released.
  If the duration of the DTMF burst (from key pressing to key releasing) is less than about 200 ms, the cellular transceiver 20 will set the duration to 20 ms before sending the DTMF signal to the cellular base station 24.
(6) Primitive Name: On-Hook Indication
  This primitive indicates that the cordless telephone has been placed to an on-hook condition. The data length is zero.
(7) Primitive Name: SMS Download Request
  This primitive indicates that the cordless telephone is to download an SMS message identified by an SMS identifier. The SMS Identifier is 16 bits long.
(8) Primitive Name: SMS Deleting Request
  This primitive indicates that the cordless telephone is to delete an SMS message indicated by a SMS identifier. The SMS identifier is 16 bits long.
(9) Primitive Name: ACK-OK
  This primitive is transmitted when the cordless telephone has received a data packet from the cellular transceiver 20 and did not find any errors in the CRC checking. The data length is zero.
(10) Primitive Name: ACK-NG
  This primitive is transmitted when the cordless telephone has received a data packet from the cellular transceiver 20 and errors were found in the CRC checking thereof. The length of the data field of this primitive is zero.
(11) Primitive Name: SLIC Service Request
  This primitive indicates that user has input an indication to start RJ-11 service from the SLIC module. The length of the data field in this command is zero.
(12) Primitive Name: Timeout Parameter Change
  This primitive carries a timeout parameter for sensing the end of dialed digits. After waiting for a predetermined time period, the cellular transceiver 20 sends the origination message to the cellular base station 24 to initiate an outgoing call. The length of the data field is eight seconds, and the number of the timeout seconds ranges from 2 to 10.

Primitives From the Cellular Transceiver (1) Primitive Name: Incoming Call Indication
  The primitive indicates that the transceiver 20 received an indication of an incoming call. The repetitive default pattern of the alerting signal is 2.0 seconds on and 4.0 seconds off. The telephone number of the calling party is maximally 32 digits, as defined by Table 2.
(2) Primitive Name: Call Connected
  This primitive indicates that the call has been connected. The length of the data field is zero.

(3) Primitive Name: Call Released

This primitive indicates that the call has either been released by the other party, or the call has ended abnormally. If the cordless the phone is ringing, ringing is interrupted when this primitive is received. The length of the data field for this primitive is zero.

(4) Primitive Name: SMS Indication

This primitive indicates that a new SMS message has been received by the cellular transceiver 20.

Data Section:
  (a) BYTE1 (8 bits) of the data field indicates the number of the SMS messages in the buffer of the transceiver 20. The buffer in the transceiver contains maximally ten SMS messages. When the number of the received messages approaches ten, the MMI module of cordless telephone base unit 14 provides an indication to user that the SMS buffer is nearly full.
  (b) Multiple 16-bit IDs provide a list of the message identifier. When the 16-bit MESSAGE_ID defined in IS-637 is available and is not set to '0000', the MESSAGE_ID is utilized as the SMS identifier. When the MESSAGE_ID is set to '0000', the transceiver 20 generates a 16-bit ID for the received SMS message.

(5) Primitive Name: SMS Data

This primitive carries one block of an SMS message. The SMS data field has about 300 bytes maximally in length, and is separated into several data blocks for transmission. A maximum length of each data block is about 50 bytes. During SMS transmission, if the cellular transceiver 20 receives an SMS download request primitive for another SMS message, the transceiver 20 stops sending the current SMS data, and begins to send the newly requested SMS data to the cordless telephone base unit 14.

Data Section:
  (a) Message identifier (16 bits).
  (b) Total data length of the SMS message (16 bits).
  (c) Data block number (8 bits, from 0 to 5).
  (d) Data block content (maximally 50 bytes).

(6) Primitive Name: Voice Message Indication

This primitive is transmitted either when there are new voice messages, or the cordless telephone base unit should extinguish the voice-mail LED blinking.

Data Section: Status of voice messages (8 bits),
  1: There are new voice messages, and cordless telephone should start the voice-mail LED blinking.
  0: The cordless telephone 14 should stop the voice-mail LED blinking, since user has accessed the voice mailbox and retrieved all messages.

(7) Primitive Name: CDMA Signal Level

This primitive is transmitted when there is a power level change in the signal strength of the received CDMA signal. The received CDMA signal strength is divided into the following three levels, NORMAL, WEAK, NO-SIGNAL. The cellular transceiver 20 has the proper processing routines to deal with the input CDMA signals, so that frequent transmissions of this primitive will not occur when the CDMA signal is very close to the thresholds.

Data Section: eight bits in length.
  0: NO-SIGNAL
  1: WEAK
  2: NORMAL (8) Primitive Name: SLIC Module Status This primitive is transmitted when the cellular transceiver 20 has detected that a conventional telephone connected to the SLIC module has changed from an on-hook condition to an off-hook condition, or from an off-hook condition to an on-hook condition.

Data Section: eight bits in length
  0: ON_HOOK,
  1: OFF_HOOK. (The cordless telephone base unit 14 stops ringing).

(9) Primitive Name: ACK-OK

This primitive is transmitted when the cellular transceiver 20 receives a data packet from the cordless telephone base unit 14 and did not find any errors in the CRC checking. The length of the data field is zero.

(10) Primitive Name: ACK-NG

This primitive is transmitted when the cellular transceiver 20 receives a data packet from the cordless telephone base unit 14 and errors were found in the CRC checking routine. The length of the data field of this primitive is zero.

(11) Primitive Name: Call Connection Failed

This primitive indicates that a call connection attempted to be established has failed, because the CDMA network was busy, etc. The length of the data field of this primitive is zero.

(12) Primitive Name: Network Access Started

This primitive indicates that the cellular transceiver 20 started to access the CDMA cellular network for a call connection. Any dialed digit primitives received thereafter are ignored.

Data Section: The telephone number sent to the CDMA base station 24 is maximally 32 digits. See Table 2.

(13) Primitive Name: SLIC Service Started

This primitive indicates that the SLIC module has provided voltage/current power to the RJ-11 jack.

Data Section: eight bits,
  0, if telephone power is provided to the inner two pins of the RJ-11 jack,
  1, if power is provided to the outer two pins of the RJ-11 jack.

(14) Primitive Name: SLIC Service Stopped

This primitive indicates that the SLIC module can not provide power to the RJ-11 jack, because voltage is already detected at the RJ-11 jack. The length of the data field of this primitive is zero.

(15) Primitive Name: Data Service Started

This primitive indicates that the cellular transceiver 20 has detected the initial operation of data service a the data-port.

Data Section: Data service type etc.

(16) Primitive Name: Data Service Stopped

This primitive indicates that the cellular transceiver 20, has detected that operation of data service at the data-port has been interrupted or stopped.

Data Section: Data service type etc.

(17) Primitive Name: CDMA Service Indicator

This primitive is transmitted when the cellular transceiver 20 has detected a change in service. The transceiver 20 will initially send a System No Service command on power up.

Data Section: eight bits.
  0: Home
  1: Roam
  2: No Service

Primitive Type Definition

The various primitives from the cordless telephone base unit 14 are set forth below.

| | |
|---|---|
| Off-Hook Indication | 0x01 |
| Dialed Digit | 0x02 |
| FLASH Indication | 0x03 |
| CONF Indication | 0x04 |
| DTMF Signal | 0x05 |
| On-Hook Indication | 0x06 |
| SMS Download Request | 0x07 |
| SMS Deleting Request | 0x08 |
| ACK-OK | 0x09 |
| ACK-NG | 0x0a |
| SLIC Service Request | 0x0b |
| Timeout Parameter Change | 0x0c |

The various primitives from the cellular transceiver 20 are set forth below.

| | |
|---|---|
| Incoming Call Indication | 0x81 |
| Call Connected | 0x82 |
| Call Released | 0x83 |
| SMS Indication | 0x86 |
| SMS Data | 0x87 |
| Voice Message Indication | 0x88 |
| CDMA Signal Level | 0x89 |
| SLIC Module Status | 0x8a |
| ACK-OK | 0x8b |
| ACK-NG | 0x8c |
| Call Connection Failed | 0x8d |
| Network Access Started | 0x8e |
| SLIC Service Started | 0x8f |
| SLIC Service Stopped | 0x90 |
| Data Service Started | 0x91 |
| Data Service Stopped | 0x92 |

FIG. 11 illustrates a call origination sequence in which digits are dialed by a user of the cordless telephone handset 12 after an off-hook condition of the telephone. The cordless telephone base unit 14 transmits to the cellular transceiver 20 an off-hook indication, as shown in sequence 160. The cellular transceiver 20 causes a dial tone to be applied to the audio path via the switched connection 144 shown in FIG. 9. On receipt of the dial tone by the user, a first dialed digit is forwarded to the cellular transceiver 20, as noted in sequence 164. Transmission of the dial tone is interrupted by the cellular transceiver 20, as noted in sequence 166. The remainder of the dialed digits are transmitted by the cordless telephone base unit 14 and received by the transceiver 20, as noted in sequence 168. The cellular transceiver 20 is programmed to wait for several seconds to assure receipt of all dialed digits, as noted in sequence 170. In call origination sequence 172, the cellular transceiver 20 transmits a signal back to the cordless telephone base unit 14 to indicate that access to the cellular network is initiated (sequence 172). In sequence 174, the cellular transceiver 20 performs an origination to establish TCH . . . and thereafter applies a ring-back tone to the audio path, via switch 144, as noted in sequence 176. The cordless telephone base unit 14 is connected via the cellular transceiver 20 to the cellular base station 24, as noted by reference numeral 178. Reference numeral 180 of FIG. 11 illustrates the conversation state in which the system remains until the user of the cordless telephone handset 12 goes on-hook. The on-hook indication is transmitted form the cordless telephone base unit 14 to the cellular transceiver 20 as noted in sequence 182. Commands in the form of primitives are transmitted from the cellular transceiver 20 to the cordless telephone base unit 14 to release the call, as noted in call sequence 184. Both the cordless telephone base unit 14 and the cellular transceiver 20 are then ready to commence the receipt of an incoming call or the transmission of an outgoing call.

In FIG. 12, there is illustrated the call origination sequence in which the dialing of digits occurs before the off-hook condition of the cordless telephone base unit 14. The off-hook indication, together with the dialed digits, are transferred from the cordless telephone base unit 14 to the cellular transceiver 20. This sequence is shown by reference numeral 190. The cellular transceiver 20 then accesses the cellular base station 24, as shown by call sequence 192. The cellular transceiver 20 then performs the origination to establish the TCH . . . , as shown in sequence 194. Call sequence 196 shows that a ring-back tone is applied on the audio path to the cordless telephone base unit 14. The call is connected between the base unit 14 and the cellular transceiver 20, as shown by call sequence 198. The conversation state 200 is then established. Once the conversation is over, the user of the cordless telephone handset 12 goes on hook, and the base unit 14 transfers the on-hook indication to the cellular transceiver 20, as noted by call sequence 202. The call is then released, as shown by sequence 204.

Figure 13:
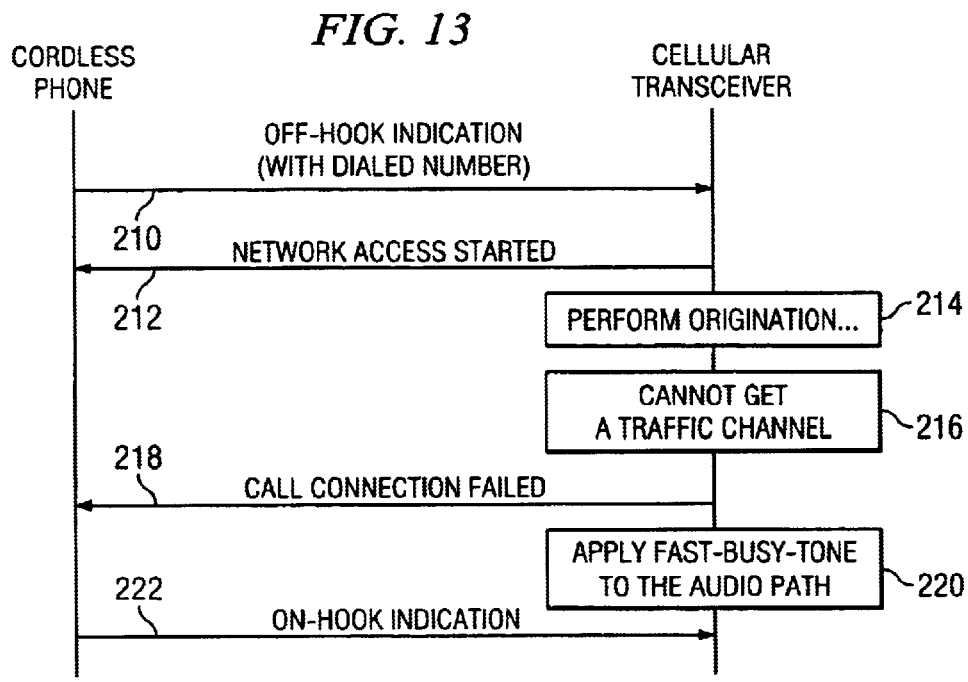
FIG. 13 illustrates a software flowchart of a call origination sequence in a situation in which the remote cellular base station is busy.

FIG. 13 illustrates a call origination sequence when the CDMA base station 24 and the corresponding cellular network are busy, to the extent that the cordless telephone 12 cannot originate a call. As noted in sequence 210, an off-hook indication and the dialed digits are forwarded from the cordless telephone base unit 14 to the cellular transceiver 20. Cellular network access is initiated, as noted by sequence 212. The cellular transceiver 20 performs the necessary origination sequences to establish TCH . . . , as noted by sequence 214. The cellular network returns a data message to the cellular transceiver 20 indicating a traffic channel is unavailable. This is shown is call sequence 216. In call sequence 218, a signal is coupled to the cordless telephone base unit 14 indicating that a call connection has failed. This is shown by call sequence 218. Call sequence 220 is carried out by the cellular transceiver 20 to apply a fast busy tone to the audio path coupled to the cordless telephone base unit 14. In response to the fast busy tone, the user of the cordless telephone goes on-hook, in which event the base unit 14 transfers an on-hook indication to the cellular transceiver 20. This is illustrated by call sequence 222.

Figure 14:
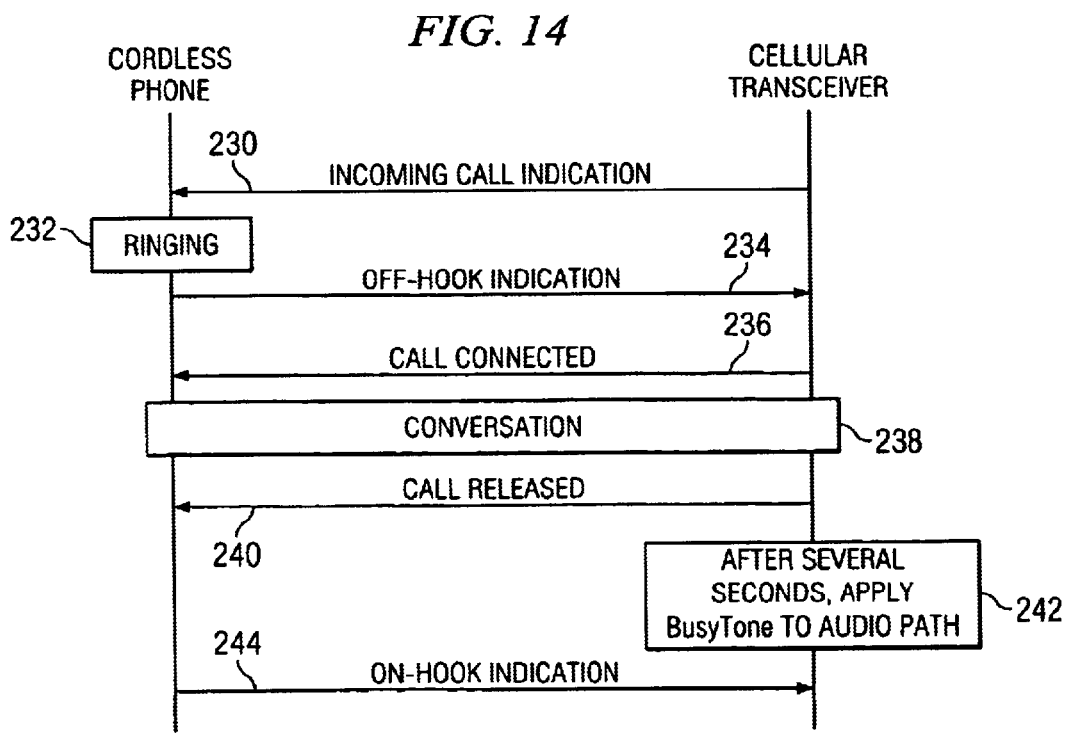
FIG. 14 is a software flowchart illustrating a call termination sequence.

FIG. 14 illustrates the programmed call termination sequence in which an incoming call to the cordless telephone is terminated. Call sequence 230 indicates that an incoming call indication is transferred from the cellular transceiver 20 to the cordless telephone base unit 14. In response, the cordless telephone initiates ringing, or another alert indication, as indicated by sequence 232. Call sequence 234 illustrates those actions by the cordless telephone 12 in transferring an off-hook indication to the cellular transceiver 20. The cellular transceiver 20 provides a call connection to the CDMA base station 24, and returns the appropriate signal to the cordless telephone. This is noted is call sequence 236. In call sequence 238, there is illustrated a conversation mode in which audio voice signals from the cordless telephone 12 are transferred on the other audio path to the cellular transceiver 20, digitized, and thereafter transferred in the CDMA frame to the cellular base station 24. If the calling party has gone on-hook, such indication is noted by call sequence 240 and transmitted to the cordless telephone. In accordance with call sequence 242, several seconds are allowed to elapse before a busy tone is applied on the audio path to the cordless telephone base unit 14. This enables the called party using the cordless telephone to be aware of the terminated incoming call. As a result, the user of the cordless telephone 12 goes on-hook, in which event the on-hook indication is transferred to the cellular transceiver 20. This is noted by call sequence 244. The incoming call is thereby terminated.

Figure 15:
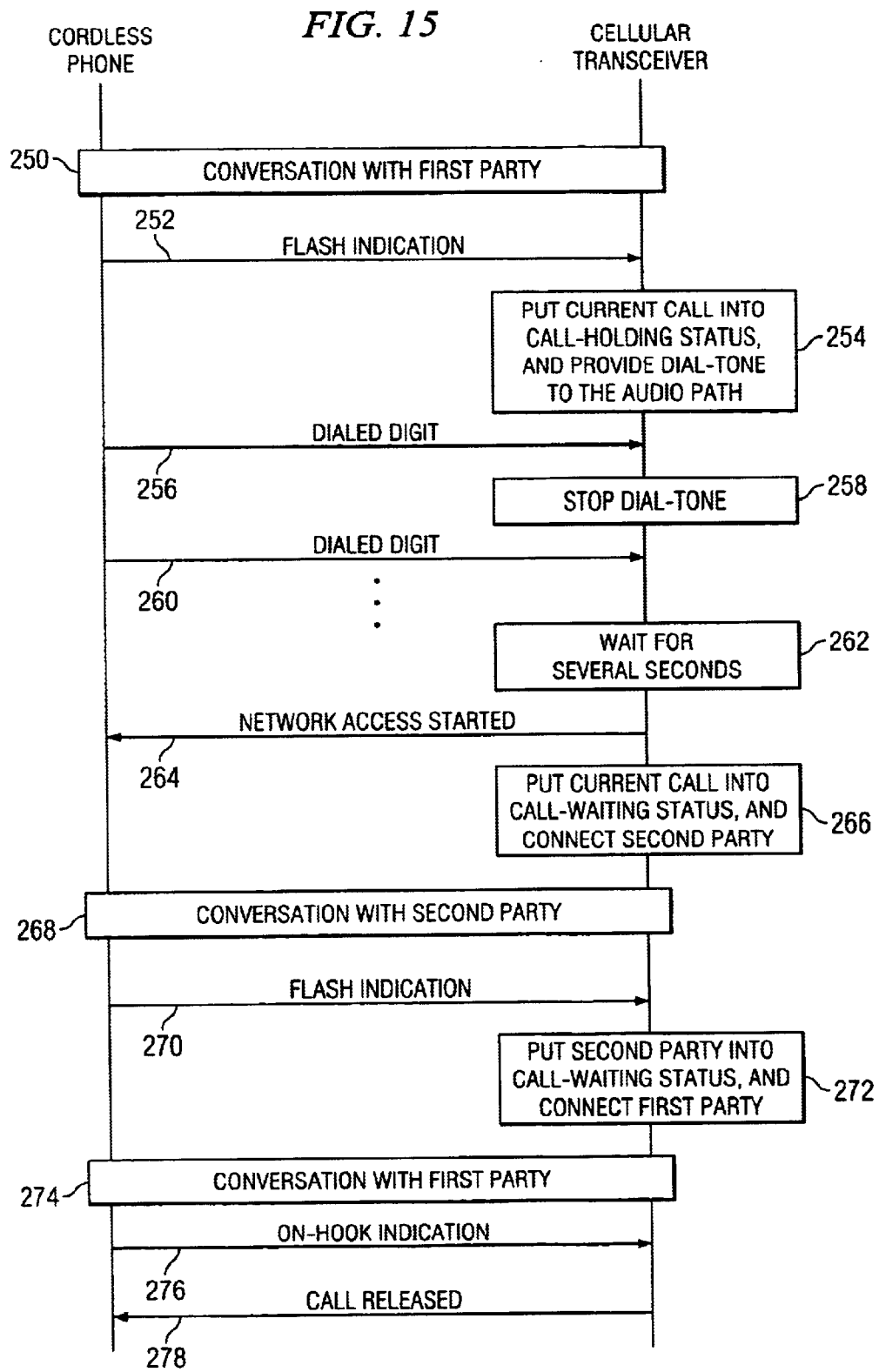
FIG. 15 is a software flowchart illustrating the call waiting sequence in which a call is originated by the remote calling party.

FIG. 15 illustrates the call processing functions of a call waiting sequence in which a second call is originated during the off-hook condition of the first call. Call sequence 250 illustrates the conversation state of the user of the cordless telephone 12 with a first party. When the user of the cordless telephone 12 desires to establish a call to a second party without going on-hook, the hook-flash switch is depressed. The cordless telephone base unit 14 then transfers a hook-flash indication to the cellular transceiver 20, as noted by sequence 252. In call sequence 254, the first call is placed in a call-holding status, and a dial tone is provided by the cellular transceiver 20 to the cordless telephone base unit 14 on the audio path. In response to the dial tone, the user of the cordless telephone handset 12 dials digits corresponding to a second party. In response to the first dialed digit, the cellular transceiver 20 interrupts the dial tone, as noted by call sequence 258. The remainder of the dialed digits of the second party are received by the cellular transceiver 20, as indicated by call sequence 260. Several seconds are allowed to elapse by the cellular transceiver 20 in order to be assured that all of the dialed digits are received. This is shown in call sequence 262. The cellular transceiver 12 then accesses the cellular network 24, as noted by call sequence 264. In call sequence 266, the call is placed in a call-waiting status, and the second party is connected to the user of the cordless telephone handset 12. The conversation state with the second party is established, as noted by call sequence 268. At the completion of the conversation with the second party, the user of the cordless telephone handset 12 can again initiate a hook flash, which indication is coupled to the cellular transceiver 20 as noted by sequence 270. In response to the second hook-flash indication, the cellular transceiver 20 places the second party in a call-waiting status, and connects the user of the cordless telephone handset 12 again to the first party. This is noted in call sequence 272. In call sequence 274, a conversation state is again entered between the user of the cordless telephone handset 12 and the first party. When it is desired to terminate the conversation with the first party, the user of the cordless telephone handset 12 can place the unit on-hook, which indication is passed to the cellular transceiver 20. This is shown as call sequence 276. The call between the user of the cordless telephone handset 12 and the first party is thus released, as noted by call sequence 278.

Figure 16:
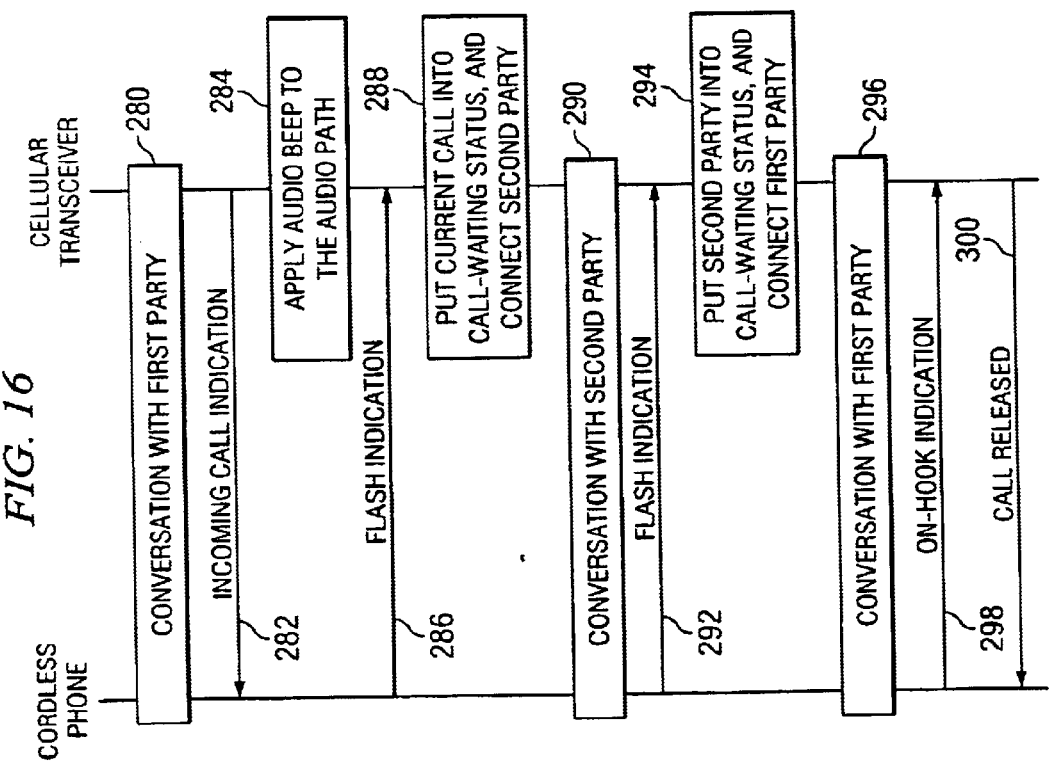
FIG. 16 is a software flowchart illustrating a call waiting sequence in which the cordless telephone is receiving a call from a remote party.

FIG. 16 illustrates a call waiting sequence, in which a second call is received during the conversation mode of a first call. Call sequence 280 indicates the conversation state between the user of the cordless telephone handset 12 and a first party. In the event a telephone call by a second party is made to the cordless telephone base unit 14, such indication is transferred by the cellular receiver 20 to the cordless telephone base unit 14. This call indication includes the application of an audio beep tone by the cellular transceiver 20 on the audio path to the cordless telephone base unit 14. If the user of the cordless telephone handset 12 desires to receive the second call, a hook-flash is initiated. The hook-flash indication is dispatched by the cordless base unit 14 to the cellular transceiver 20, as noted by sequence 286. In response, the cellular transceiver 20 places the first call in a call-waiting state, and connects the second party to the cordless telephone base unit 14. This is shown by call sequence 288. In sequence 290, the user of the cordless telephone handset 12 and the second party are placed in a conversation state. When the conversation with the second party is terminated by the user of the cordless telephone handset 12, a hook-flash is initiated, in which event the indication thereof is transmitted to the cellular transceiver 20. This is shown by call sequence 294. A call sequence 296 is initiated, in which the user of the cordless telephone handset 14 and the first party are placed in a conversation state. Upon termination of the call with the first party, an on-hook indication is passed from the cordless telephone base unit 14 to the transceiver 20. This is shown by call sequence 298. In call sequence 300, the call is released and the cordless telephone base unit 14 is ready to accept other incoming calls, or to initiate other outgoing calls.

Figure 17:
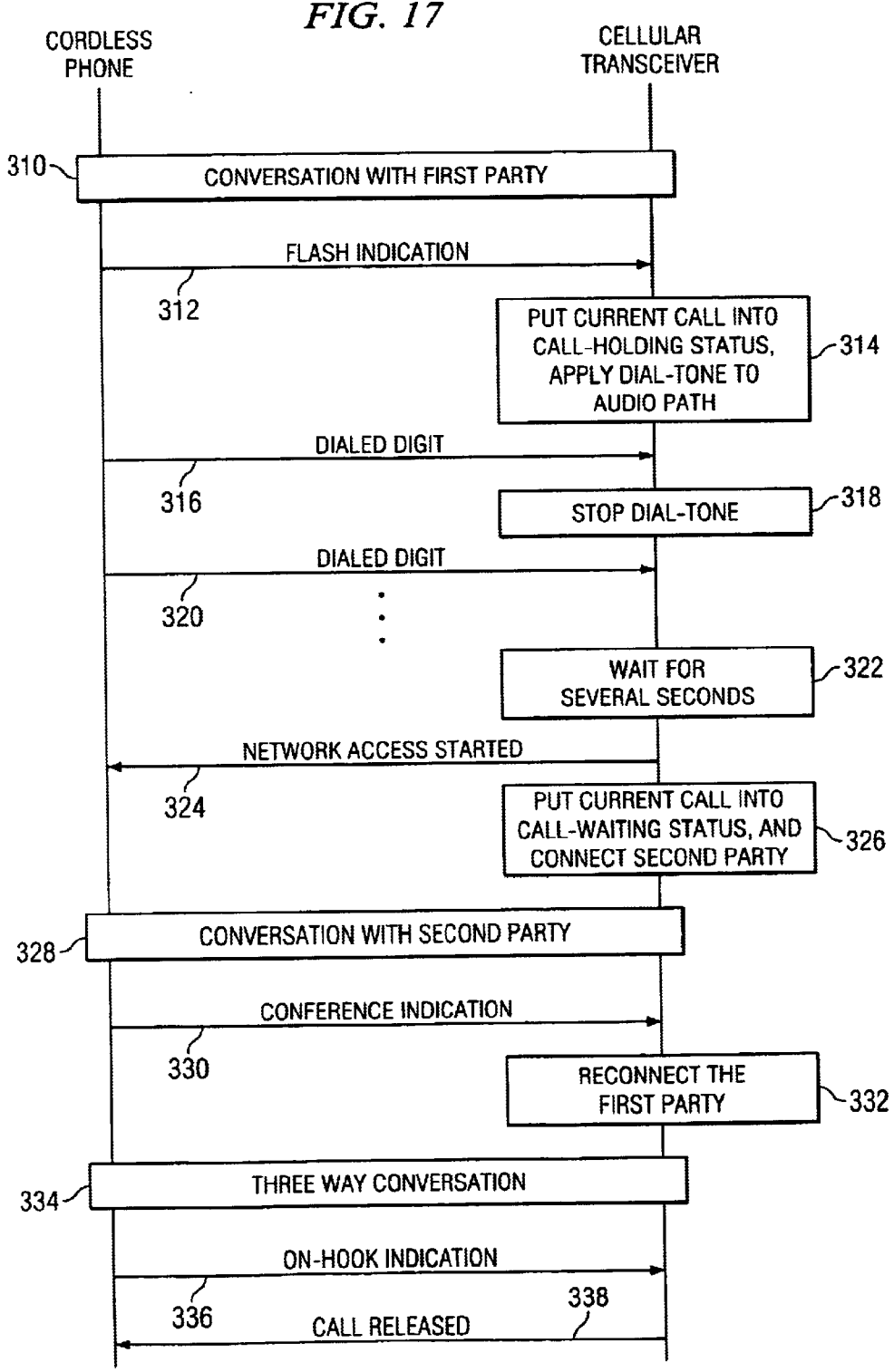
FIG. 17 is a software flowchart illustrating a three-way conversation sequence in which the user of the cordless telephone originates another telephone call.

A three-way conversation sequence is illustrated in FIG. 17. Call sequence 310 illustrates a conversation state with a first party. When it is desired to initiate a call to a second party, the user of the cordless telephone handset 12 produces a hook-flash indication, which indication is dispatched to the cellular transceiver 20 (call sequence 312). In call sequence 314, the current call with the first party is placed in a call-holding status, and a dial tone is transferred to the cordless telephone base unit 14 on the audio path. A first dialed digit is transferred in call sequence 316 to the cellular transceiver 20. The transceiver 20 interrupts dial tone, as noted by sequence 318. The remaining digits are transferred to the cellular transceiver 20 in accordance with call sequence 320. After several seconds to assure that all of the dialed digits have been received by the cellular transceiver 20, (sequence 322), access to the cellular network 24 is initiated. This is shown in sequence 324. Then, the current call with the first party is placed in a call-waiting status, and the second party is connected to the user of the cordless telephone handset 12. This is shown by call sequence 326. In sequence 328, the user of the cordless telephone handset 14 is placed in a conversation state with the second party. If it is desired to establish a three-way conference between the user of the cordless telephone handset 12, the first party, and the second party, then the user activates a conference switch, or otherwise inputs dialed digits indicating the same. The conference indication is forwarded in sequence 330 to the cellular transceiver 20. The cellular transceiver 20 then reconnects the first party to the conversation, as noted in sequence 332. A three-way conversation state is then carried out between the user of the cordless telephone handset 12 and the two other parties, as noted by sequence 334. The three-way conference call is terminated by the user of the cordless telephone handset 12 going on-hook. The on-hook indication is transferred to the cellular transceiver 20 in sequence 336. The transceiver 20 then releases the call and the cordless telephone 12, as noted by call sequence 338.

Figure 18:
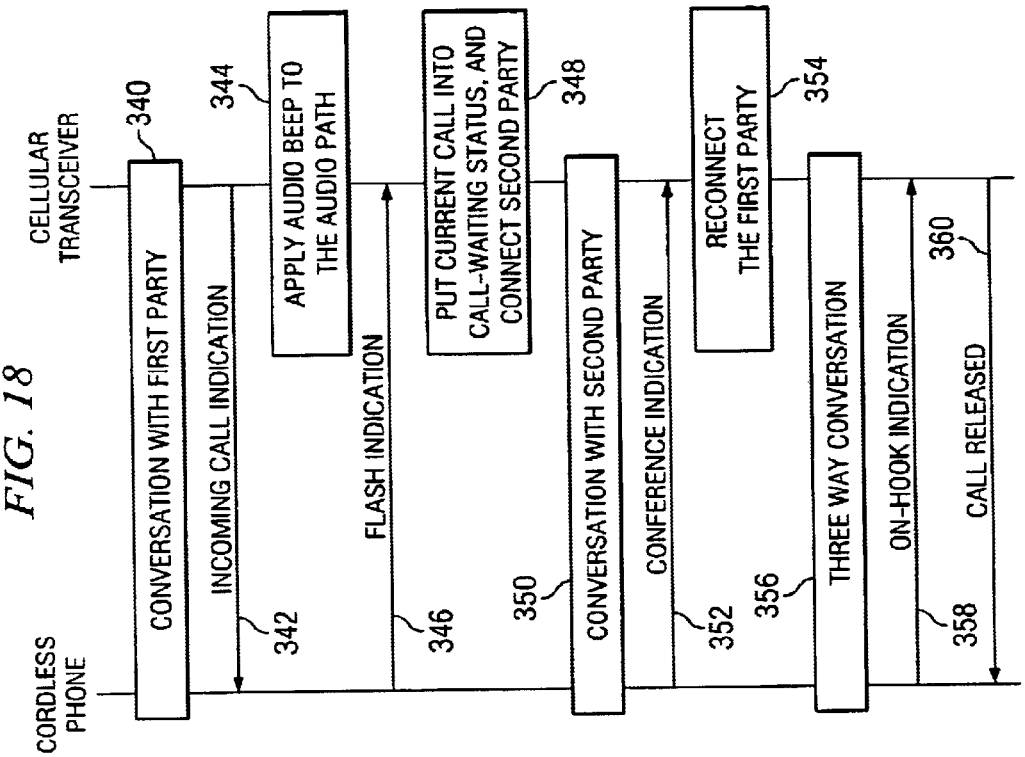
FIG. 18 is a software flowchart illustrating a three-way conversation sequence in which the cordless telephone receives a call from a remote party.

FIG. 18 illustrates a three-way conversation sequence, in which another party involved in an existing two-party call places an incoming call to the cordless telephone 12. Sequence 340 illustrates a conversation state between the cordless telephone and the first party. When an incoming call by a second party is initiated to the cordless telephone 12, such indication is transferred by the cellular transceiver 20 to the cordless telephone base unit 14, as noted by sequence 342. Call sequence 344 is carried out by the cellular transceiver 20, in which an audio beep is applied to an audio path directed to the cordless telephone. When the user of the cordless telephone handset 12 hears the audio beep, a hook-flash can be initiated, in which event the indication thereof is transferred to the cellular transceiver 20. This is noted by call sequence 346. In call sequence 348, the current call with the first party is placed in a call-waiting state, and the incoming call from the second party is connected to the cordless telephone 12. A conversation state with the second party is then established, as noted by sequence 350. Call sequence 352 shows that a conference is desired between the three parties, in which event a conference indication is transferred from the cordless telephone 12 to the cellular transceiver 20. This is noted by call sequence 352. In call sequence 354, the cellular transceiver 20 reconnects the first called party to establish a conference call. A three-way conversation state is established, as noted by call sequence 356. When the user of the cordless telephone 12 desires to terminate the three-way conference, the handset 12 is simply placed on-hook. The on-hook indication is transferred in sequence 358 to the cellular transceiver 20. The transceiver 20 then releases all calls, as noted by call sequence 360.

FIG. 19 illustrates the call sequence concerning the transferring of DTMF digits. Sequence 366 of FIG. 19 illustrates a communication from the cellular transceiver 20 to the cordless telephone base unit 14, indicating the existence of an incoming call. The cordless telephone base unit 14 provides a ringing signal to the user thereof, as noted by call sequence 360. In response to the ringing signal, the user places the cordless telephone handset 12 in an off-hook condition, which indication is transmitted to the cellular transceiver 20. This is noted in call sequence 370. In call sequence 372, a call connection is established between the cellular transceiver 20 and the cordless telephone base unit 14. The conversation state is then placed into effect, as noted by sequence 374. When the user of the cordless telephone depresses any digits on the keypad thereof, as noted by sequence 376, a corresponding DTMF signal is sent to the cellular transceiver 20, as noted in call sequence 378. The DTMF code is then digitized appropriately by the cellular transceiver 20 and sent to the cellular base station 24. This is noted in call sequence 380. For subsequent depressions of keys on the keypad of the cordless telephone handset 12 similar actions are carried out, as noted by call sequences 382 and 386. The conversation state between the called and calling parties is then reinstituted, as noted in sequence 388. When the call is released by the called party, an indication thereof is forwarded from the cellular transceiver 20 to the cordless telephone base unit 14, as noted in call sequence 390. After several seconds a busy tone is applied to the audio path from the cellular transceiver 20 to the cordless telephone base unit 14, as noted in call sequence 392. When the user of the cordless telephone 12 goes on-hook, an indication thereof is sent to the cellular transceiver 20. This is noted in call sequence 394.

FIG. 20 illustrates a diagram of the call sequences involved in an SMS transfer. An SMS transfer is a small message service arrangement in which short digital messages can be sent and received by computers, cellular telephones, and the like. In block 400, it is noted that the cordless telephone 12 has been placed to an on-hook condition. The cellular transceiver 20 is in a state in which it has received an SMS message, as noted by reference numeral 402. When one or more messages for the user of the cordless telephone 12 are available and ready to be accessed, the cellular transceiver 20 forwards an indication of the same (sequence 404) to the cordless telephone base unit 14. As noted by call sequence 406, the user of the cordless telephone 12 dials in the appropriate digits to retrieve the SMS message. The SMS download request, together with the message ID, are forwarded by the cordless telephone user to the cellular transceiver 20, as noted by call sequence 408. In call sequences 410 and 412, the SMS data message is downloaded by the cellular transceiver 12 from the cellular system 24, and forwarded to the cordless telephone 12. The display on the cordless telephone 12 displays the existence of a first SMS message, as noted by sequence 414. The cordless telephone user, desiring to retrieve the first message, inputs an indication of the same into the handset 12, whereupon the SMS download request is forwarded to the cellular transceiver 20. This is shown by call sequence 416. The content of the first SMS message is downloaded and forwarded to the cordless telephone user, as well as an indication of any subsequent SMS message, such as a second message. This is shown in call sequence 418. The existence of a second message is displayed on the cordless telephone display, as noted in call sequence 420. These sequences continue until the cordless telephone user does not desire to retrieve any subsequent messages, or all of the messages have been retrieved. When it is desired to delete a message by the user, the user inputs an indication of the same, whereupon an SMS deleting request, together with a message ID is forwarded to the cellular transceiver 20. This is shown in sequence 422. The cellular transceiver 20 then deletes the message, as shown by sequence 424. The deletion of any subsequent messages by the user is carried out in the same sequence, as noted by call sequences 426 and 428.

In FIG. 21, there are illustrated the various sequences in the processing of voice mail. In sequence 430, an indication of a presence of a voice message is forwarded from the cellular transceiver 20 to the cordless telephone base unit 14. This indication is transmitted, together with the number of messages. In sequence 432, the cordless telephone base unit 14 causes a message waiting LED to blink. In response, the user can begin to access the voice mailbox by going off-hook and dialing predetermined digits which may include a password and digits for accessing the voice mail storage system. The off-hook indication and the access phone number are transferred from the cordless telephone 12 to the cellular transceiver 20, as noted in call sequence 434. The cellular transceiver 20 carries out the necessary sequences to be connected to the voice mail system. This is shown in sequence 436. In sequence 438, the cordless telephone 12 is connected to the voice mailbox system, whereupon audio voice messages are transferred to the cordless telephone user. This is shown in call sequence 440. When the cordless telephone user has completed listening to the message, the handset 12 can be placed in an on-hook condition. The on-hook indication is forwarded from the cordless telephone 12 to the cellular transceiver 20, as noted by call sequence 442. The call is released, as shown by sequence 444. When all of the messages have been exhausted, a message from the cellular base station 24 is transmitted, announcing to the cellular transceiver 20 that no more voice messages are available. This is shown in call sequence 446. In call sequence 448, a voice message indication is sent from the cellular transceiver 20 to the cordless telephone base unit 14, indicating that the number of messages existing is zero. A "zero" voice message indication is received by the cordless telephone base unit 14, and the message waiting LED is extinguished, as noted by call sequence 450.

The communication system of the present invention provides for the reset of the system in the event that an abnormality or anomaly occurs. It is noted that the microprocessor 38 in the cordless telephone base unit 14 and the microprocessor 52 in the cellular transceiver 20, each include a watchdog timer. The watchdog timers are software timers that operate in a conventional manner. If the watchdog timer in the cellular transceiver 20 activates, the microprocessor 52 is reset. The microprocessor unit in the cordless telephone base unit 14 is also reset at the same time, so that the two units can be initialized and synchronized together. On the other hand, if the watchdog timer in the cordless telephone base unit 14 activates and resets the microprocessor 38, the corresponding microprocessor 52 in the cellular transceiver 20 is not reset. With this situation, the cordless telephone base unit 14 is programmed to recover the conversation, if possible. In the event the cordless telephone base unit 14 is in a mode other than a conversation mode at the time of the reset, the microprocessor 38 is programmed to proceed to a standby mode after the reset. In this event, the microprocessor 58 in the cellular transceiver 20 also proceeds to a standby mode.

The primitives carried out by the cordless telephone base unit 14, functioning as a master device, are set forth below.

(1) Primitive Name: Reset Indication
This primitive provides an indication that the cordless telephone base unit 14 has been reset. The data field of this primitive includes eight bits.
0: indicates that the cordless telephone base unit 14 is not able to return to the conversation mode. The microprocessor 38 is programmed to perform a system Start routine and proceed to the standby mode.
1: The cordless telephone base unit 14 is able to return to the conversation mode. Confirmation from the cellular transceiver 20 is required.

(2) Primitive Name: Conversation Recovery Indication
This primitive indicates that the status of the conversation recovery was successfully carried out by the cordless telephone base unit 14. The data field of this primitive is eight bits in length.
0: The cordless telephone has successfully recovered to the conversation mode.
1: The cordless telephone base unit 14 was not able to recover to the conversation mode, and the processor 38 proceeds to the standby mode. The cellular transceiver 20 is to proceed in disconnecting the telephone call.

The following are the primitives carried out by the cellular transceiver 20.

(3) Primitive Name: Cellular Transceiver Status
This primitive indicates the status of the cellular transceiver 20 is started from a reset condition. The data field of this primitive is eight bits in length.
0: A cellular transceiver module 20 has just started from a system reset condition. This means that the reset was caused by the watchdog timer in the cellular transceiver 20. After receiving this message, the cordless telephone base unit 14 performs the system Start routines, and proceeds to a standby mode.
1: The cellular transceiver is in a conversation mode. This means that the reset was caused by the watchdog timer in the cordless telephone base unit 14. After receiving this message, the cordless telephone base unit 14 attempts recovery to the conversation mode, and transmits the conversation recovery indication primitive to the cellular transceiver 20.
2: The cellular transceiver 20 is in a mode other than the conversation mode. This means that the reset was caused by the watchdog timer in the cordless telephone base unit 14. After receiving this message, the cordless telephone base unit 14 carries out the system Start routines, and proceeds to the standby mode. After transmitting this message, the cellular transceiver 20 proceeds to the standby mode.

FIG. 22 is a software flowchart capsulizing the reset processing sequence, in which the reset was caused by the cellular transceiver. As shown by reference numeral 454, the system reset is activated by the cellular transceiver 20. A reset indication is transferred from the cordless telephone base unit 14 to the cellular transceiver 20. This sequence is shown by reference numeral 456. In sequence 458, the cellular transceiver status is transferred to the cordless telephone base unit 14, indicating that the reset was caused by the cellular transceiver 20. In sequence 46, the cordless telephone base unit 14 performs the system Start routine, and proceeds to the standby mode. In sequence 462, the cellular transceiver 20 continues system initialization and other routine processing.

In FIG. 23, there is illustrated a flowchart showing the reset processing sequences, in which the reset is caused by the cordless telephone base unit 14. In sequence 464, the communication system is shown to be in a conversation mode. In sequence 466, the cordless telephone base unit 14 causes a reset to occur, in response to some anomaly. In sequence 468, the reset indication primitive is transmitted to the cellular transceiver 20. The reset indication indicates in a data field that the conversation mode recovery is possible. In sequence 470, the cellular transceiver 20 forwards to the cordless telephone base unit 14 a module status, indicating the conversation mode is in process. The cordless telephone base unit 14 performs a conversation recovery routine, as shown by sequence 472, in an attempt to recover to the conversation mode. Sequence 474 illustrates the transmission of a primitive to the cellular transceiver 20, indicating that the conversation mode has been recovered. In sequence 476, the communication system returns to the communication mode.

FIG. 24 illustrates a software flowchart showing the reset processing sequence in which recovery to the conversation mode is not made. Call sequence 48 shows that the conversation mode between the cordless telephone base unit 14 and cellular transceiver 20 has been interrupted. In sequence 480, the cordless telephone base unit 14 initiates a reset. The reset indication is transferred to the cellular transceiver 20, as shown by sequence 482. This reset indication indicates that the conversation mode recovery is possible. In sequence 484, the cellular transceiver 20 transmits to the cordless telephone base unit 14 a status, indicating that the cellular transceiver 20 is not in a conversation mode. The cordless telephone base unit performs system start routines and proceeds to the standby mode, as noted by sequence 486. In like manner, the cellular transceiver 20 proceeds to the standby mode, as noted by call sequence 488.

Slic Module

Figure 25:
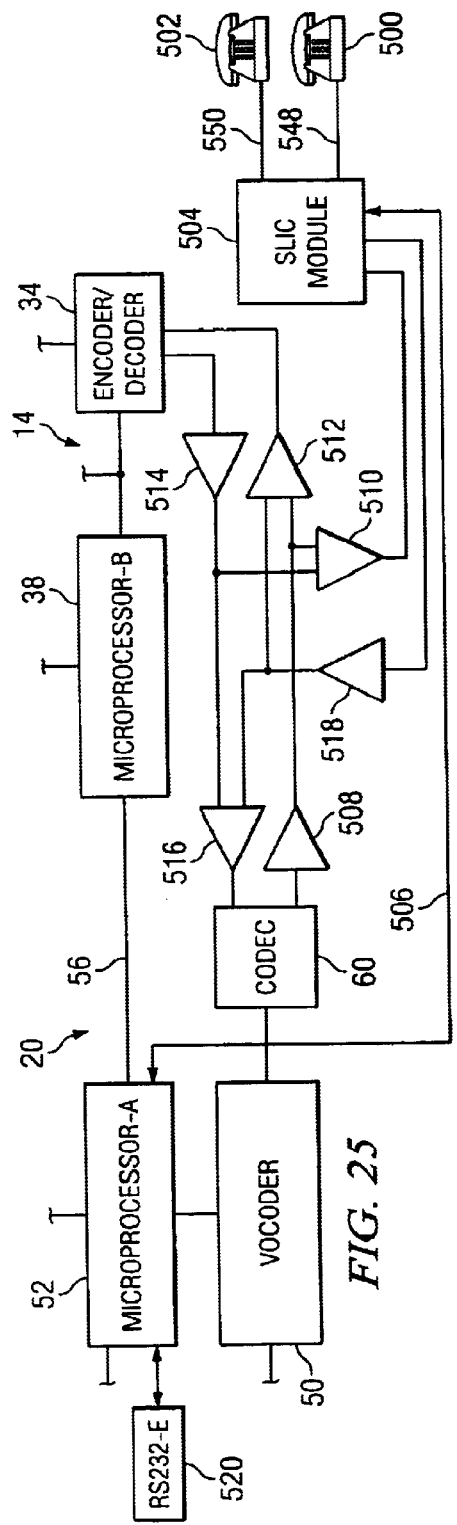
FIG. 25 is a block diagram illustrating the basic functional components of the communication system providing POTS-type telephone service to regular telephone sets, using a SLIC module.

In accordance with another feature of the invention, the cellular transceiver 20 can also be configured to operate and provide telephone service to a number of standard telephone sets, via conventional RJ-11 jacks. In other words, in addition to the utilization of a cordless telephone handset 12 with the cellular base station 24, other standard telephone sets can be connected to the cellular transceiver 20 for communication with the cellular base station 24. FIG. 25 illustrates the relevant portions of the cellular transceiver 20 and the cordless telephone base station 14, as configured to provide telephone service for two standard telephone sets 500 and 502.

A subscriber line interface circuit (SLIC) module 504 is controlled by the cellular transceiver microprocessor 52 by way of bus 506. Those skilled in the art may prefer to control the SLIC module 504 with the microprocessor 38 of the cordless telephone base unit 14. Nonetheless, when controlled by the cellular transceiver microprocessor 52, the transceiver 20 is the master and the cordless telephone base unit 14 becomes the slave. An I/O port (not shown) of the microprocessor 52 communicates signals to and from the SLIC module 504 by way of the multi-conductor bus 506. Audio tones and call progress signals are transmitted by the cellular transceiver CODEC 60 by way of a buffer driver 508. The buffer driver 508 couples the audio signals to the SLIC module 504 via summing amplifier 510, and to the cordless telephone base station encoder/decoder 34 via summing amplifier 512. In the opposite direction, audio signals are transferred from the cordless telephone base station encoder/decoder 34 via a buffer driver 514, to a SLIC module summing amplifier 510, as well as transferred to a cellular transceiver summing amplifier 516. The output of the summing amplifier 516 is coupled to an input of the cellular transceiver CODEC 60. Signals transferred from the SLIC module 504 are coupled via a buffer driver 518 to respective inputs of summing amplifiers 512 and 516. Lastly, a data interface 520 is provided for allowing RS 232-E communications with the cellular transceiver microprocessor 52. The audio path thus connects the various components of the telephone communication system to allow audio signal communications therebetween.

Figure 26:
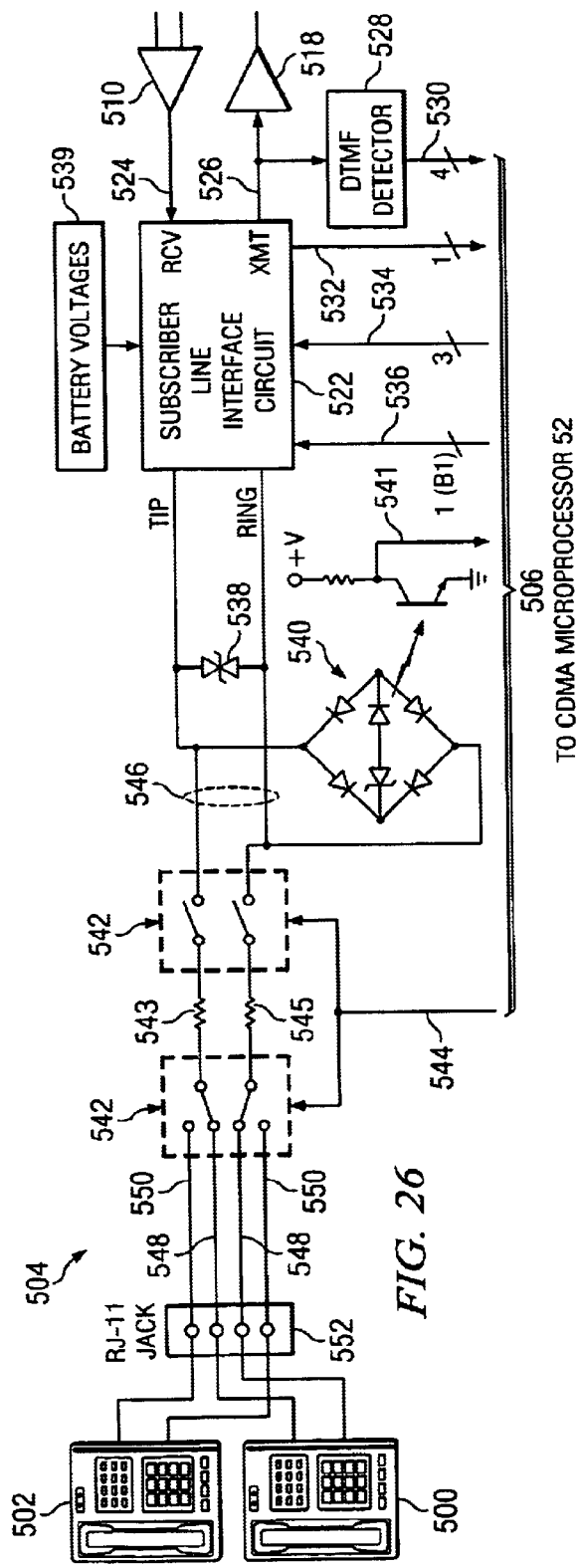
FIG. 26 is a detailed diagram of the SLIC module for providing telephone service to a pair of telephone sets via a RJ-11 jack and a telephone line switch.

With reference to FIG. 26, there are shown the details of the bus connections between the cellular transceiver microprocessor 52 and the SLIC module 504. The module 504 includes a subscriber line interface circuit 522, comprising an integrated circuit L8560AP obtainable from Lucent Technologies. Audio signals can be coupled to the SLIC device 522 on receive line 524 via the summing amplifier 510. Audio signals can be transmitted from the SLIC device 522 on line 526 to the buffer driver 518, as well as to a DTMF detector 528. A 4-wire bus 530 comprising part of the microprocessor bus 506 is effective to couple decoded DTMF signals to the cellular transceiver microprocessor 52. A line 532 carries loop detection signals to the cellular transceiver microprocessor 52. A 3-conductor bus 534 applies digital signals from the cellular transceiver microprocessor 52 to place the SLIC device 522 in various operational states. In like manner, a bus conductor 536 carries digital ring signals from the microprocessor 52 to signal the SLIC device 522 to provide corresponding ringing signals on the tip and ring telephone lines. A tip and ring conductor output of the SLIC device 522 is coupled to a protection circuit 538 as well as to a voltage detector 540. The voltage detector 540 is effective to determine if the magnitude of the voltages, if any, on the tip and ring conductors exceeds a threshold voltage. Prior to providing SLIC telephone services, the tip and ring conductors are sensed to verify that the telephone lines are not connected to the central office battery feed circuits, or other voltage services. The output of the voltage detector 540 is coupled on line 541 of bus 506 to the cellular transceiver microprocessor 52. The protection circuit 538 includes standard telephone line protection components to assure that the voltage detector 540 and the SLIC device 522 are not damaged by over-voltage and over-current conditions that may exist on the telephone lines serviced by the SLIC module 504. The voltage detector 540 is described below. In the preferred form of the invention, overvoltage protection can be provided to the tip and ring telephone lines and to the SLIC device 522 by using a 51-volt back-to-back zener diode 538. With such type of protection, the differential voltage between the telephone line conductors is clamped to about 51 volts, irrespective of the polarity thereof. A pair of 150 ohm resistors 543 and 545 are connected in series with the respective tip and ring lines to provide overcurrent protection to the SLIC device 522. These series resistors are of the positive temperature coefficient (PTC) type, where the resistance increases with increasing line current. Many other overcurrent and overvoltage protection schemes can be utilized by those skilled in the art.

The cellular transceiver microprocessor 52 controls a pair of switches 542 by two relay coil conductors 544. The switch 542 is in practice two double-pole double-throw switches. As will be described in more detail below, the switches 542 can be placed in a first state so that the output tip and ring lines 546 from the protection circuit 538 are open circuited with respect to the first telephone line 548 and the second telephone line 550. In a second state, the switches 542 are operative to connect the protection circuit output tip and ring 546 to the first telephone line 548. In a third state, the switch 542 is operative to connect the output tip and ring conductor 546 to the second telephone line 550. The first telephone line 548 is coupled to inner pins of an RJ-11 jack 552 which, in turn, is connected to one standard telephone set 500. The second telephone line 550 is coupled to outer pins of the RJ-11 jack 552, and to the second standard telephone set 502. As will be set forth more fully below, when the central office switching system supplies power to the first or second telephone lines 548 or 550, the SLIC device 522 is prevented by the microprocessor 52 from being connected to the respective telephone line. On the other hand, if the first telephone line 548 or the second telephone line 550 is not powered by the public switched telephone network system, then the SLIC device 522 can detect this condition and apply the appropriate local power for allowing the telephone sets 500 and 502 to communicate via the cellular system. The telephone jack RJ-11 may be connected directly to the housing of the communication system, or the jack can be installed as a wall-mounted jack which then would be wired to the communication system of the invention. As can be appreciated, the wiring of telephone jacks in new or existing structures can lead to inadvertent errors. If, for example, a foreign voltage is coupled to the SLIC device 522, the device can be destroyed if the magnitude of the voltage exceeds about 50 volts. Standard telephone ringing and other normal signaling voltages can well exceed this voltage. By first testing the voltage across the tip and ring lines before providing SLIC service, abnormal telephone operation or damage to the communication system can be avoided.

Figure 27:
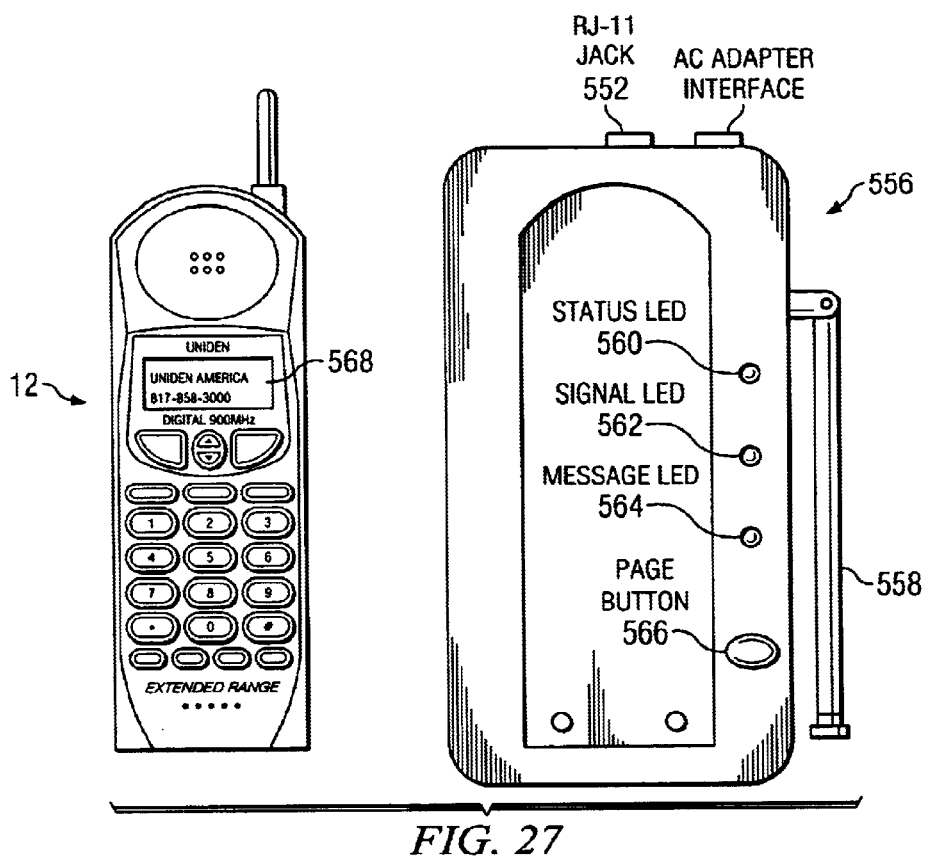
FIG. 27 illustrates the cordless telephone handset, and the cordless telephone base unit integrated into one housing with the cellular transceiver.

FIG. 27 illustrates the integrated cellular transceiver and cordless telephone base station 556 which operate in conjunction with the cordless telephone handset 12. While not shown, the standard functions, such as battery charging, are provided for the cordless telephone base station 14. In the preferred form of the invention, the RF unit 32 of the cordless telephone base unit 14 and the RF and IF module of the cellular transceiver 20 utilize the same transmit/receive antenna 558. The operating frequencies of 900 mHz for the cordless telephone base unit 14 and 1.9 gHz for the cellular transceiver 20 can utilize the same antenna 558 for both transmit and receive operations.

The integrated communication system 556 includes a status LED 560 that includes a red and green indicator. When the green indicator is on, this indicates an off-hook condition of the cordless telephone handset 12. When the red indicator is on, the handset battery is charging. When the green LED is off, the handset 12 is in an on-hook condition, but a stand-by mode. When the green indicator is blinking, this means that a telephone extension 500 or 502 is off-hook, as connected to the RJ-11 jack 552. When the red indicator is blinking, this means that the battery backup is low and should be charged. When the green LED is blinking, a security code is being transmitted. Signal LED 562 is a green indicator. When the green indicator 562 is on, this means that an acceptable CDMA cellular signal is being received. When the green indicator 562 is blinking, this means that a weak CDMA signal is being received. When the green indicator 562 is off, an insufficient CDMA signal is being received. A message LED 564 is provided on the cordless telephone base station 14. The message LED 564 constitutes an indicator that is red. When the message LED 564 is off, this means that no SMS or voice mail has been activated. When the message LED 564 is blinking, this means that either a new SMS or voice mail message is available. A page button 566 allows a user of the integrated communication system 556 to page the user of the handset 12.

In addition to the foregoing, the cordless telephone handset 12 includes a display 568 for use by the user in scrolling through a number of menu items. The display 568 is driven by the MMI software of FIG. 4. Scrolling through a menu of items by the cordless telephone handset 12 is carried out by pressing the up arrow or the down arrow on the handset 12 in a conventional manner. Although a number of menu items can be selected, one menu item selectable by the user of the cordless telephone handset 12 is the use of SLIC service. The selection of the SLIC service allows the user to activate one of telephone sets 500 or 502, or both, during a conference type call. When SLIC service is selected via the cordless telephone handset 12, corresponding primitives and commands are forwarded to the cordless telephone base station microprocessor 38. In turn, corresponding primitives are transmitted to the cellular transceiver microprocessor 52, via the asynchronous serial bus 56.

The cellular transceiver microprocessor 52 of FIG. 26 controls the SLIC module 504 via parallel bus 506 in the following manner. As noted above, the user can select a telephone set 500 or 502 by way of the menu on the cordless telephone handset display 568. The cellular transceiver microprocessor 52 controls the SLIC module 504 to carry out a voltage test on the selected telephone line 548 or 550. In the event that the user did not select a particular telephone line, the default telephone line is line 548 coupled to the telephone set 500. The microprocessor 52 transmits appropriate logic signals via line 544 to the telephone line switches 542 for connecting the output tip and ring conductors 546 to the first telephone line 548. As noted above, the over-voltage protection circuit 538 protects the various circuits and components of the SLIC module 504 from excessive electrical signals that may exist at the terminals of the RJ-11 jack 552.

When the switch 542 has provided the proper connections, the voltage detector 540 is effectively connected across the telephone line 548. The voltage detector 540 may have rudimentary circuits well known to those skilled in the art for detecting whether or not a voltage, and the magnitude thereof, exists on the telephone line 548. In the preferred form of the invention, the voltage detection circuit 540 includes a diode bridge connected across the tip and ring telephone lines. Connected between two opposite nodes of the bridge is a zener diode with a breakdown voltage of about 9.10 volts. Connected in series with the zener diode is a light emitting diode optically coupled to a transistor switch. When the voltage across the tip and ring lines exceeds about 11.0 volts, the transistor turns on and signals the cellular transceiver microprocessor 52 that an overvoltage condition exists on the telephone line intended to be used. Thus, central office battery, ringing and other voltages can be sensed by the detector circuit 540. It should be noted that the particular SLIC device 522 identified above includes telephone line drive circuits that can be placed in a high impedance state prior to providing SLIC telephone service to either of the telephone sets 500 and 502. Thus, the possibility of damage is reduced when in the high impedance state, should the voltage detection circuit 540 detect an excessive voltage on the telephone lines.

Those skilled in the art may prefer to connect the detector circuit 540 between the RJ-11 jack 552 and the switch 542. With this alternate arrangement, the switch 542 can remain open and the telephone line voltage be monitored to determine if the switch 542 can be safely closed to connect the telephone line to the SLIC device 522.

In any event, the voltage detector 540 transmits digital signals on line 541 to the microprocessor 52 indicating the presence or absence of an overvoltage that may exist differentially between the tip conductor or ring conductor. If a foreign voltage is detected on the first telephone line 548, the cellular transceiver microprocessor 52 does not proceed with SLIC service. Rather, the microprocessor 52 transmits a SLIC Service Stopped primitive to the cordless telephone base station 14 via the asynchronous bus 56. The cordless telephone base station 14 then causes a message to be displayed on the cordless telephone handset 12, indicating that telephone service on line one 548 is denied. The same procedures are carried out if SLIC telephone service is requested on the second telephone line 550.

While the voltage detector can sense voltages in excess of 110 volts during the providing of SLIC service, the microprocessor 52 is not programmed to interrupt such service should an overvoltage be detected during SLIC service. Rather, protection of the SLIC circuits during this service is obtained by the PTC resistors 543 and 545, as well as the clamping zener diodes 538. Those skilled in the art may prefer to program the microprocessor 52 to respond to overvoltages during SLIC service by releasing the on-going call and opening the switches 542. Many other protection schemes are available.

On the other hand, if the cellular transceiver microprocessor 52 determines that no foreign voltage exists on the first telephone line 548, then the subscriber line interface circuit 522 is configured to provide telephone service to telephone line 548. In addition, the cellular transceiver microprocessor 52 transmits the primitive SLIC Service Started to the cordless telephone base station 14. In response, the base station 14 causes a message to be displayed on the cordless telephone handset display 568, indicating that telephone service on line 548 is in process.

In providing SLIC telephone service to line 548, the subscriber line interface circuit 522 provides the appropriate tip and ring battery voltages by way of power supplies 539. Preferably, −48 volts is supplied to the telephone line in a standard manner until the telephone set 500 is placed in an off-hook condition by the user. Thereafter, the SLIC device 522 provides the telephone line with 5–6 volts for talking battery.

The cellular transceiver microprocessor 52 is programmed to periodically monitor the status of the telephone line 548 to determine if a foreign voltage exists thereon, that is a voltage from the central office switching system. In other words, if by inadvertence the RJ-11 jack becomes connected to the central office twisted pair, or if the telephone line from the central office has been requested to be activated so that central office battery is supplied to the same RJ-11 jack that is connected to the communication system of the invention, then such a condition is sensed by the voltage detection circuit 540. Typically, the battery voltage of the central office switching system will be of −48 volt. In any event, if a foreign voltage is found on the telephone line 548, SLIC service requests are denied. In this event, the cellular transceiver microprocessor 52 transmits a primitive SLIC Service Stopped to the cordless telephone base station 14. A corresponding message is caused to be displayed on the visual display 568 of the cordless telephone handset 12.

While subscriber line interface circuits other than that identified above can be utilized in conjunction with the invention, the L8560 integrated circuit functions in the following detailed manner. When the subscriber line interface circuit 522 is to complete an incoming call to a telephone set 500 or 502 from the cellular base station 24, the cellular transceiver microprocessor 52 causes a digital square wave signal to be applied at the ringing frequency on line 536 of FIG. 26. The square wave signal applied to the device 522 is preferably a 5-volt amplitude square wave voltage.

The SLIC device 522 can detect on-hook or off-hook conditions of the telephones 500 and 502, and as a result thereof places a respective logic high or logic low signal on line 532 to the microprocessor 52. DTMF signals generated by either telephone set 500 or 502 are coupled through the subscriber line interface circuit 522, via the tip and ring lines, to the DTMF detector 528. As noted above, the DTMF detector 528 converts the dual tone signals to corresponding 4-bit digital signals. The digital signals are coupled on bus 530 to the cellular transceiver microprocessor 52. The cellular transceiver microprocessor 52 then transfers the digital signals to the cellular base station 24.

Hook flash signals generated by the telephone sets 500 and 502 generate the same signals as on-hook and off-hook conditions, but of different durations. Hook flash signals are generally on-hook indications for 300 ms–1100 ms. The cellular transceiver microprocessor 52 receives the on-hook/ off-hook conditions by way of conductor 532. The microprocessor 52 includes a software timer for determining whether such signals constitute an on-hook condition, an off-hook condition, or a hook flash condition. Dial pulse signals are determined by software in the cellular transceiver microprocessor 52 in much the same manner as hook flash signals. However, the dial pulse signals are of different durations and thus can be detected as such.

The various call processing tones, such as dial tone, busy tone, fast busy tone and ring back tone are generated in the cellular transceiver 20. The cellular transceiver microprocessor 52 functions to cause the vocoder 50 to generate such tones and couple the same via the CODEC 60 on the audio path to the SLIC module 504, via the summing amplifier 510. The subscriber line interface circuit 522 can then apply such call processing signals to one or the other telephone sets 500 or 502.

In the preferred form of the invention, the telephone sets 500 and 502 are of the loop-start signaling type. This means that when the telephone set is placed in an off-hook condition, the telephone line loop is closed and current is drawn from the −48 volt supply. This signals the SLIC device 522 that service is requested. The integrated circuit 522 is designed to support such type of telephone line signaling. For other types of telephone line signaling protocols, other circuits and subscriber line interfaces or conversion circuits may be required.

Figure 28:
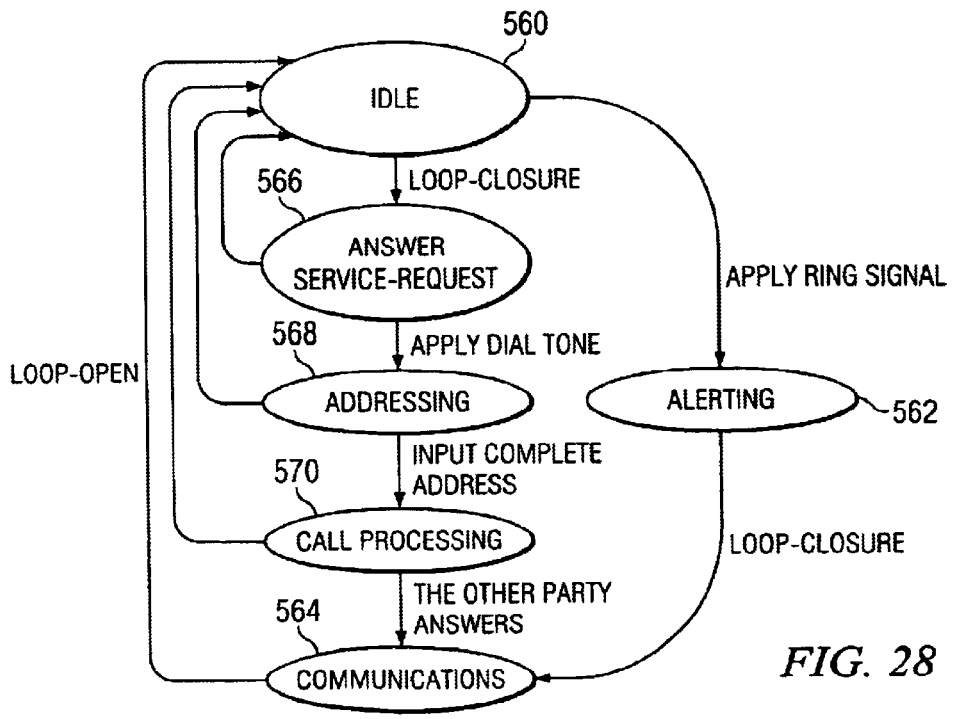
FIG. 28 is a software flow chart illustrating the various call processing states in completing telephone calls with the communication system of the described embodiment.

FIG. 28 illustrates the various call processing states carried out by the cellular transceiver microprocessor 52 for the loop-start signaling protocol. In the various call processing states, there is an idle state 560 in which there is no ongoing call in process. In response to an incoming call to one of the telephone sets 500 or 502, the cellular transceiver microprocessor 52 is programmed to proceed from the idle state 560 to an alerting state 562. In the alerting state 562, ringing signals are applied by the subscriber line interface circuit 522 to the tip and ring lines connected to the telephone set to be rung. In response to the telephone ringing, the user of the telephone set lifts the handset from the cradle, or pushes a relevant button to place the telephone in an off-hook condition. The telephone loop is thus closed, whereupon the microprocessor 52 proceeds from the alerting state 562 to the communication state 564.

When a telephone call is initiated by an off-hook condition of one of the telephone sets 500 or 502, the following call processing states are involved. In response to the loop closure of the telephone set 500 or 502 requesting service, the cellular transceiver microprocessor 52 proceeds from the idle state 560 to an answer service-request state identified by reference numeral 566. In response to the loop closure, the microprocessor 52 is also programmed to cause a dial tone signal to be applied via the audio signal path and summing amplifier 510 to the subscriber line interface circuit 522. The circuit 522 then applies the dial tone to the tip and ring lines connected to the telephone set requesting service, whereupon the addressing state 568 is entered. In response to the dial tone, the user of the telephone set inputs DTMF digits. Once a complete telephone number is entered by the user of the telephone set 500 or 502, a call processing state 570 is entered by the microprocessor 52. The DTMF digits are converted and transferred as digital signals to the cellular base station 24, and therefrom transferred to the called party. A communications state 564 is entered when the destination party answers. From each of the processing states, 564–568, return can be made back to the idle state 560. In returning from each of the noted call processing states to the idle state 560, such transfer is in response to on-hook condition of the telephone set 500 or 502. An on-hook condition is generally an open loop condition of the tip and ring lines.

Call Processing Operations for Originating a Call

In the origination of a call by one of the telephone sets 500 or 502, the following functions are carried out.

1. Check whether the originating telephone set 500 or 502 goes off hook: The processor 52 checks the off-hook operation as follows:

STEP 1: The processor 52 checks whether there is an Off-Hook Indication message from the cordless telephone handset 12. If there is no such a message, proceed to STEP 2. Otherwise, if at least one regular telephone 500 or 502 connected to the SLIC module 504 is already in an off-hook mode, the microprocessor 52 disregards any dialed number from the cordless telephone handset 12, and proceeds to STEP 7. Otherwise, the microprocessor 52 proceeds to STEP 3.

STEP 2: The microprocessor 52 checks the status of the SLIC module 504 to confirm whether any regular telephone 500 or 502 connected to the SLIC module 504 is in an off-hook mode. If there are no telephones in the off-hook mode, the microprocessor proceeds to STEP 1. Otherwise, if the cordless telephone handset 12 is already in an off-hook mode, the microprocessor 52 disregards any dialed number from the SLIC module 504 and proceeds to STEP 7. Otherwise, the microprocessor 52 goes to STEP 3 below.

2. Apply Dial-Tone/Fast-Busy-Tone to the audio path:
   STEP 3: If the CDMA cellular network 24 is not available, the microprocessor 52 generates a fast-busy-tone and applies it to the audio path, then proceeds to STEP 7. Otherwise the microprocessor 52 generates a dial-tone and applies it to the audio path. Then, the microprocessor proceeds to STEP 4.
3. Detect the dialed number:
   STEP 4: The SLIC module 504 detects DTMF signals and converts the signals into a 4-bit digital code. The microprocessor 52 then interrupts the dial-tone after confirmation that a DTMF signal has been received. The microprocessor 52 then sends the dialed number to the CDMA cellular base station 24 after a complete telephone number has been received. Then, the microprocessor 52 proceeds to STEP 5.
4. Apply Ring-Bank-Tone/Fast-Busy-Tone:
   STEP 5: If the microprocessor 52 has received the message for generating a ring-back tone, it will generate the ring-back tone, and apply it to the audio path until another message is received for interrupting the tone. Then, the microprocessor 52 proceeds to STEP 6. If the microprocessor 52 receives a message announcing that there are no CDMA traffic channels available, it will generate the fast-busy-tone and apply it to the audio path. The microprocessor then proceeds to STEP 7.
5. Start conversation:
   STEP 6: The cordless telephone system now is in the conversation mode. If both the cordless telephone 12 and the regular telephones 500 and 502 connected to the SLIC module 504 are in the off-hook mode, the microprocessor 52 will establish a talking path to send the voice signals to all of the telephones, and at the same time receive the voice signals from all of the telephones.
5. Detect DTMF signals during a conversation: During a conversation a user may send DTMF signals to the other party for a variety of reasons. The microprocessor 52 checks for the receipt of DTMF signals as follows:
   The cordless telephone base station 14: the cordless telephone base station 14 checks the keypad of the cordless telephone handset 12 and detects any key pressed. Then, it will send a DTMF Signal message containing the information of the key to the microprocessor 52.
   The SLIC module 504: the SLIC module 504 detects the DTMF signal using the DTMF detector 528, and sends the corresponding digital signal to the cellular transceiver 20. Finally, microprocessor 52 sends the DTMF digital code to the CDMA cellular base station 24.
6. Detect flash signal for Call-Waiting/Three-Way Conversation: During a conversation, a user may send a hook flash signal to initiate a call-waiting/three-way conversation. The cordless telephone base unit 14 checks the flash signal as follows:
   The keypad is checked to confirm whether the flash key was pressed. After confirmation that the flash key was pressed, a Flash Indication message is sent to the cellular transceiver microprocessor 52.
   The SLIC module 504 detects the flash signal by detecting On-Hook/Off-Hook status change, and the requisite on-hook duration.
7. Apply Busy Tone to the audio path: If the destination party releases the call first, the cellular transceiver microprocessor 52 will receive a Call-Release message. After about five seconds, the microprocessor 52 causes a busy-tone to be generated, and applies it to the audio path.
8. Check whether user ends the call: The cordless telephone base unit 14 checks the on-hook operation as follows:
   STEP 7: The cellular transceiver microprocessor 52 monitors the messages from the cordless telephone base unit 14. If an On-Hook Indiction message is received from the cordless telephone base unit 14, the microprocessor 52 will check whether the SLIC module 504 is yet in an off-hook mode. If the SLIC module 504 is still in an off-hook mode, call processing proceeds to STEP 8. Otherwise, call processing goes to STEP 9.
   STEP 8: The cellular transceiver microprocessor 52 monitors the status of the SLIC module 504 through thNSTAT line 532. If it found that all the regular telephones 500 and 502 connected to the SLIC module 504 are in the on-hook mode, it will check whether the cordless telephone 12 is still in the off-hook mode. If the cordless telephone 12 is still in the off-hook mode, the microprocessor proceeds to STEP 7. Otherwise, it goes to STEP 9.
   STEP 9: The cellular transceiver microprocessor 52 sends a Call-Release message to the cellular base station 24 and exits conversation mode.

Call Processing Operations for Completing an Incoming Call

The follows are the basic operations for completing an incoming call to the telephones 500 and 502 associated with the cellular telephone system.

1. Start ringing: In response to an incoming call, the cellular transceiver 20 will initiate ringing of the respective telephone 500 and 502 with the following steps.
   STEP1: The cellular transceiver microprocessor 52 will check whether the cordless telephone 12 is in off-hook mode. If it is off-hook, microprocessor 52 will not complete the call. If the telephone 500 or 502 is on-hook, call processing proceeds to STEP 2.
   STEP 2: The cellular transceiver microprocessor 52 will check whether any of the regular telephones 500 or 502 connected to the SLIC module 504 are in the off-hook mode. If any one telephone set 500 or 502 is off-hook, the microprocessor 52 will not complete the call. Otherwise, the microprocessor 52 goes to STEP 3.
   STEP 3: The SLIC module 504 sends a ring signal to the telephone line, and at the same time the microprocessor 52 sends an Incoming Call Indication message to the cordless telephone base unit 14 to request the imitation of ringing. Then, the microprocessor proceeds to STEP 4.
2. Check whether the user picks up the phone: The off-hook operation is as follows:
   STEP 4: The status of cordless telephone base unit 14 is checked. If the cellular transceiver microprocessor 52 receives an Off-Hook Indication message from the cordless telephone base unit 14, the microprocessor 52 will interrupt transmission of the ringing signal to the SLIC module 504, and proceed to STEP 7. Otherwise, call processing proceeds to STEP 5.
   STEP 5: The status of the SLIC module 504 is checked. If the SLIC module 504 detects an off-hook condition from a regular telephone set 500 or 502, the microprocessor 52 interrupts the ring signal transmittal to the SLIC module 504 and sends a SLIC Module Status primitive to the cordless telephone base unit 14 to indicate that a regular telephone 500 or 502 has gone off-hook. The microprocessor 52 then proceeds to STEP 8. Otherwise it goes to STEP 6.

STEP 6: Add one count to the timer and determine if the time to interrupt ringing has elapsed. If the timer has timed out, the microprocessor 52 stops the ringing and terminates the call. Then, a Call Released primitive is transmitted to the cordless telephone base unit 14. Otherwise, call processing proceeds to STEP 4.

STEP 7: The microprocessor 52 sends a Call Connected message to cordless telephone base unit 14 and disregards any dialed digit or number from the SLIC module 504. Call processing proceeds to STEP 9.

STEP 8: The microprocessor 52 sends a Call Connected message to cordless telephone base unit 14 and disregards any dialed digit or number from the cordless telephone base unit 14. Call processing proceeds to STEP 9.

STEP 9: The cordless telephone base unit 14 is placed in the conversation mode.

1. Detect a DTMF signal during a conversation: During a conversation, a user of the regular telephones 500 or 502 may send DTMF signals to the other party. The presence of DTMF signals is checked as follows:

The cordless telephone base unit 14: the cordless telephone base unit 14 monitors the keypads and detects any key the user pressed. Then, it will send a DTMF Signal message containing the identification of the key to the cellular transceiver 20.

The SLIC module 504: the SLIC module 504 detects DTMF signals from the telephones 500 or 502 with the DTMF detector 528 and sends the corresponding digital signal to the cellular transceiver microprocessor 52. The microprocessor 52 sends the DTMF digital code to the CDMA cellular base station 24.

2. Detect flash signal for Call-Waiting/Three-Way Conversation: During a telephone call, a user may send a flash signal to initiate a call-waiting/three-way conversation. The flash signal is checked as follows:

The cordless telephone base unit 14 checks the keypad of the cordless handset 12 to confirm whether the flash key has been pressed. After it has been determined that the flash key was pressed, a Flash Indication message is sent to the cellular transceiver microprocessor 52.

The SLIC module 504 detects a flash signal by detecting an On-Hook/Off-Hook status change, and the duration of the on-hook condition.

3. Apply Busy Tone to the audio path: If the destination party releases the call first, the cellular transceiver 20 will receive a Call-Release message. After about five seconds, the cellular transceiver microprocessor 52 generates a busy-tone and applies the tone to the audio path.

4. Check whether the user terminates the call. The cordless telephone system checks the on-hook operation of the telephone set in use as follows:

STEP 10: The cellular transceiver 20 monitors messages transferred from the cordless telephone base unit 14. If an On-Hook Indication message is received from the cordless telephone base unit 14, it will check whether the SLIC module 504 is still in an off-hook mode. If the SLIC module 504 is still in an off-hook mode, call processing proceeds to STEP 11. Otherwise call processing proceeds to STEP 12.

STEP 11: The cellular transceiver microprocessor 52 monitors the status of the SLIC module 504 through the NSTAT line 532. If it is determined that all the regular telephones 500 and 502 connected to the SLIC module 504 have been placed in the on-hook mode, it will check whether the cordless telephone handset 12 is still in the off-hook mode. If the cordless telephone handset 12 is still in the off-hook mode, call processing proceeds to STEP 10. Otherwise, call processing proceeds to STEP 12.

STEP 12: The cellular transceiver 20 sends a Call-Release message to the cellular base station 24 and exits the conversation mode.

The communication system is then prepared for processing subsequent incoming and outgoing telephone calls. An advantage of the communication of the invention is that by using the SLIC module, the users of the telephones are presented with the traditional call progress tones, but service is by way of the cellular wireless system. By providing the line protection, the communication system is protected from damage, should the system be plugged into an RJ-11 jack coupled to a local central office.

While the preferred embodiment of the method and apparatus has been disclosed with reference to a specific communication system, it is to understood that. many changes in detail may be made as a matter of engineering choices without departing from the spirit and scope of the invention as defined by the appended claims. Indeed, those skilled in the art may prefer to embody the apparatus in other forms, and in light of the present description they will find it easy to implement that choice. Also, it is not necessary to adopt all of the various features of the present disclosure into a single arrangement in order to realize the individual advantages.

What is claimed is:

1. A communication system, comprising:

a cellular transceiver for providing wireless communications with a cellular base station;

a cordless telephone and associated cordless telephone base station;

a programmed processor complex for coupling communications and communication signals between said cordless telephone base station and said cellular transceiver so that said cordless telephone can communicate via said cellular base station;

a jack and plug arrangement for connecting a POTS telephone by way of a telephone line to said communication system;

a sensor for sensing foreign voltages on said telephone line;

said processor complex programmed for responding to said sensor for preventing communication by said POTS telephone via said cellular base station if a foreign voltage is detected on said telephone line;

a circuit for controlling communications between said POTS telephone and the telephone line;

said cordless telephone adapted for receiving inputs from a user thereof to control by way of said processor complex whether said POTS telephone can or cannot communicate information via said telephone line; and said communication system operative to allow communications by the cordless telephone and the POTS telephone at the same time with said cellular base station.

2. The communication system of claim 1, further including a switch arrangement for coupling said telephone line to said communication system, said switch arrangement controlled by said processor complex.

3. The communication system of claim 2, wherein said switch arrangement open circuits the telephone line to said POTS telephone during a non-active state of said POTS telephone so that said POTS telephone is disconnected from all communication services.

4. The communication system of claim 2, wherein said telephone line comprises a first telephone line, and further including a second telephone line associated with a second POTS telephone line, and said switch arrangement is operative to couple either said first telephone line or said second telephone line to said communication system, but not both at the same time.

5. The communication system of claim 4, wherein said switch arrangement is effective to open circuit both said first and second telephone lines when said first and second POTS telephones are inactive.

6. The communication system of claim 1, further including a subscriber line interface integrated circuit connected between said telephone line and said communication system.

7. The communication system of claim 6, further including a bus connecting said integrated circuit to said processor.

8. The communication system of claim 7, further including an audio bus connecting said integrated circuit to said processor.

9. The communication system of claim 8, wherein said audio bus includes a transmit audio bus and a receive audio bus.

10. The communication system of claim 1, wherein said sensor comprises a diode bridge connected across said telephone line, a light emitting diode coupled to said diode bridge, and a light responsive transistor for providing said signaling.

11. The communication system of claim 1, wherein said switch is operative to couple one of a pair of telephone lines to said wireless telephone system, and said switch being operative to provide an open circuit between said telephone lines and said wireless telephone system.

12. The communication system of claim 1, further including an RJ-11 jack for coupling said telephone to said wireless telephone system.

13. The communication system of claim 12, wherein said RJ-11 jack is wall mounted.

14. The communication system of claim 1, further including a first audio summing circuit for summing audio signals from the cordless telephone with audio signals from said POTS telephone, said first audio summing circuit providing a composite audio signal for transmitting by said cellular transceiver to said cellular base station.

15. The communication system of claim 14, further including a second audio summing circuit for summing audio signals from said cellular transceiver with audio signals from said POTS telephone, said second audio summing circuit providing a composite audio signal for transfer to said cordless telephone.

16. The communication system of claim 1, wherein a cordless handset of said cordless telephone includes a menu-driven visual display, and further including a menu selectable function for placing the POTS telephone in communications with the communication system.

17. The communication system of claim 1, further including a switch for switchably connecting said POTS telephone to said telephone line, said switch controlled by said cordless telephone via said processor complex.

18. The communication system of claim 1, wherein said processor complex programmed to respond to signals input to said cordless telephone for allowing conferencing between said cordless telephone and the POTS telephone.

19. A communication system, comprising:
said communication system housed within a housing adapted for mounting to a wall or setting on a desk;
a subscriber telephone line extending from said housing and for connection to a first telephone set, said subscriber telephone line not actively connected to a central office switching system;
a subscriber line interface integrated circuit in said housing providing telephone service to said subscriber telephone line;
a programmed microprocessor in said housing for controlling said subscriber line interface integrated circuit;
a line switch in said housing connected in said subscriber telephone line for connecting and disconnecting said subscriber telephone line to said subscriber line interface integrated circuit, said line switch controlled by said microprocessor;
a voltage sensor in said housing coupled to said subscriber telephone line for sensing a voltage thereon, said voltage sensor providing a voltage indication to said microprocessor;
said microprocessor being responsive to said voltage indication to control said line switch;
a second telephone coupled to said communication system, said second telephone set adapted for receiving a user input for coupling control signals to said microprocessor to control said line switch to thereby connect or disconnect said second telephone set to said subscriber telephone line.

20. The communication system of claim 19, further including a second subscriber telephone line for connection to a second telephone set, and said line switch is operative to couple said integrated circuit to one of the subscriber telephone lines at one time, and operative to disconnect both subscriber telephone lines from said integrated circuit.

21. The communication system of claim 20, further including an RJ-11 jack coupling both said subscriber telephone lines to said line switch.

22. The communication system of claim 19, wherein said second telephone set comprises a cordless telephone.

23. The communication system of claim 19, further including circuits for conferencing the audio signals input to the respective first and second telephone sets when said first telephone set is connected to said subscriber telephone line by said line switch.

24. A method of providing telephone service with a communication system, comprising the steps of:
providing said communication system housed in a desk mounted unit;
providing telephone service by a subscriber line interface integrated circuit to a telephone set by way of a telephone line;
providing wireless telephone service to a cordless telephone; and
prior to providing telephone service to said telephone line, testing the telephone line for a foreign voltage, and if there is no foreign voltage on the telephone line, coupling information between said telephone set on said telephone line via said subscriber line integrated circuit, and said cordless telephone, thereby conferencing said telephone set and said cordless telephone together.

25. The method of claim 24, further including providing POTS telephone service to a telephone set connected to said telephone line.

26. The method of claim 24, further including disconnecting the telephone line from said integrated circuit if a foreign voltage is found on said telephone line as a result of said testing.

27. The method of claim 24, further including providing telephone service to said cordless telephone and not to the telephone line if said cordless telephone goes to an off-hook condition before said telephone set connected to the telephone line goes off hook.

28. The method of claim 27, further including disregarding dialed digits of said telephone set while said cordless telephone remains off hook.

29. The method of claim 24, further including switchably connecting the telephone set to said subscriber line under control of signals input into said cordless telephone set.

* * * * *